United States Patent
Israelsen

(10) Patent No.: US 10,810,858 B2
(45) Date of Patent: Oct. 20, 2020

(54) INFRARED IMAGING SYSTEMS AND METHODS FOR GAS LEAK DETECTION

(71) Applicant: Quantum IR Technologies, LLC, South Jordan, UT (US)

(72) Inventor: Mark Israelsen, Draper, UT (US)

(73) Assignee: QUANTUM IR TECHNOLOGIES, LLC, South Jordan, UT (US)

(*) Notice: Subject to any disclaimer, the term of this patent is extended or adjusted under 35 U.S.C. 154(b) by 0 days.

(21) Appl. No.: 16/400,774

(22) Filed: May 1, 2019

(65) Prior Publication Data

US 2019/0340914 A1 Nov. 7, 2019

Related U.S. Application Data

(60) Provisional application No. 62/666,614, filed on May 3, 2018.

(51) Int. Cl.
| | |
|---|---|
| *G08B 21/14* | (2006.01) |
| *G08B 21/18* | (2006.01) |
| *H04N 5/33* | (2006.01) |
| *G01M 3/04* | (2006.01) |
| *G01M 3/00* | (2006.01) |
| *G06T 7/00* | (2017.01) |

(52) U.S. Cl.
CPC ............ *G08B 21/14* (2013.01); *G01M 3/002* (2013.01); *G01M 3/04* (2013.01); *G06T 7/001* (2013.01); *G08B 21/182* (2013.01); *H04N 5/33* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 4,555,627 A | 11/1985 | McRae, Jr. | |
| 4,958,076 A * | 9/1990 | Bonne | G01N 21/3504 250/339.13 |
| 7,119,337 B1 * | 10/2006 | Johnson | G01J 3/02 250/339.13 |
| 2009/0200466 A1 | 8/2009 | Mammen et al. | |
| 2012/0273680 A1 | 11/2012 | Furry | |
| 2016/0203694 A1 | 7/2016 | Hogasten et al. | |

(Continued)

OTHER PUBLICATIONS

International Search Report and Written Opinion issued in corresponding PCT Application No. PCT/US2019/030227, dated Jul. 10, 2019.

(Continued)

*Primary Examiner* — Talha M Nawaz
(74) *Attorney, Agent, or Firm* — Maschoff Brennan

(57) ABSTRACT

A system for detecting a gas leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect a gas leak. The imaging analysis computer can be configured to detect a gas where gas should not be (or is not present in a baseline) in order to determine that there is a gas leak in the vicinity. The gas can be a hydrocarbon gas or carbon monoxide, or other.

26 Claims, 10 Drawing Sheets

(56) References Cited

U.S. PATENT DOCUMENTS

2017/0336281 A1* 11/2017 Waxman ............ G01N 21/3504
2018/0266944 A1* 9/2018 Waxman ............... G01J 3/4412

OTHER PUBLICATIONS

Hodgkinson, J., and Tatam, P.R., "Optical gas sensing: a review," Measurement Science andTechnology, vol. 24, pp. 95 (Nov. 1, 2013).

* cited by examiner

INFRARED IMAGING SYSTEMS AND METHODS FOR GAS LEAK DETECTION

CROSS-REFERENCE

This patent application claims priority to U.S. Provisional Application No. 62/666,614 filed May 3, 2018, which provisional is incorporated herein by specific reference in its entirety.

BACKGROUND

Field

The present invention relates to systems and methods for detecting gas leaks. In some aspects, the present invention relates to infrared imaging systems and methods for detecting gas clouds and gas emissions from industrial equipment and components. In some aspects, the gas that is detected is a hydrocarbon gas or a carbon monoxide gas.

Description of Related Art

Generally, it is problematic to have any unwanted gas leak that emits unwanted gasses, such as industrial gasses (e.g., hydrocarbons, carbon monoxide, etc.), into environmental air or even the air around industrial equipment and components (e, g, pipeline) where it does not belong. Gas leaks can occur in any component that uses, stores or transports gas, which mandates gas leak detection, especially considering the toxicity and pollution potential of these industrial gases. Environmental damage can be reduced or prevented with faster gas leak detection. Loss of industrial gases from leaks is also leaves a financial toll. As a result, improvements in gas leak detection can be good for the environment and for reducing refinery or other facility operating costs.

Therefore, it would be advantageous to be able to detect gas in air from a gas leak. Furthermore, it would be beneficial to be able to detect any industrial gas leak (e.g., hydrocarbon gas or carbon monoxide) from any location.

SUMMARY

In some embodiments, a system for detecting a gas leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect a gas leak of a hydrocarbon gas or a carbon monoxide gas. The imaging analysis computer can be configured to detect a gas cloud (e.g., hydrocarbon and/or carbon monoxide) in the air where gas should not be (or is not present in a baseline) in order to determine that there is a gas leak in the vicinity.

In some embodiments, the imaging analysis computer is configured to: obtain at least one infrared image of a fixed field of view; identify at least one gas absorption region in the at least one infrared image, wherein the at least one gas absorption region includes pixels having an absorption and/or saturation in a narrow infrared bandwidth, wherein the narrow infrared bandwidth is absorbed by a gas leak, wherein the gas leak is selected from a hydrocarbon gas or carbon monoxide gas; determine the at least one gas absorption region as being a gas leak; and generate an alert that identifies the presence of the gas leak in the fixed field of view. In some aspects, the at least one infrared imaging sensor can include at least one mid wave cooled infrared camera configured for detecting absorption by the gas leak. The narrow infrared bandwidth is: about 3.2 microns to about 3.4 microns for the hydrocarbon gas; or about 4.5 microns to about 4.7 microns for the carbon monoxide gas.

In some embodiments, the system can be configured to obtain at least one baseline infrared image of a fixed field of view without the gas leak being present. The baseline image can be updated over time prior to the gas leak being detected in the fixed field of view. The baseline image can be an image from an imaging sensor, or a historical composite of pixel data from a plurality of baseline images over time. This allows for comparisons between images with no gas leak and images that have a gas leak (e.g., suspected of having a gas leak and being confirmed to have the gas leak). Otherwise, when the current image has no gas leak, it is a no gas leak image. The protocol continues until an image with a gas leak in it is obtained.

In some embodiments, the system can perform methods to analyze all pixels in the fixed field of view for changes from the at least one baseline infrared image to at least one subsequent infrared image. The changes can be in the pixel data for each pixel, such as changes in the pixel data that indicates changes in absorption of infrared light by the gas. Gases are known to absorb infrared light in the narrow infrared bandwidth. That is, each pixel can be analyzed by analyzing the pixel data in a subsequent image and comparing that subsequent pixel data to the baseline pixel data. The analysis can include computationally processing the subsequent pixel data to determine a pixel value, such as absorbance for that pixel. The subsequent pixel value is compared to the baseline pixel value. The baseline pixel value can be a range of suitable pixel values, and may include a distribution of pixel values when there is no gas leak. When the subsequent pixel value is within an allowable range of the baseline pixel value, the subsequent pixel value does not identify a gas leak being present. However, when the subsequent pixel value is outside the allowable range of the baseline pixel value, then a determination is made as to whether or not the subsequent pixel value is indicative of a gas leak being present.

In some embodiments, the system can perform methods to identify variable differences in absorbance for each pixel in the field of view between the at least one baseline infrared image and the at least one subsequent infrared image. The variable difference can be determined by assessing changes in pixel absorbance value for a specific pixel (e.g., pixel location in the pixel array of the imaging device) from a baseline image to a subsequent image. However, when the subsequent pixel absorbance value is outside the allowable range of the baseline pixel absorbance value, then a determination is made as to whether or not the subsequent pixel value is indicative of a gas leak being present.

In some embodiments, the system can identify one or more first pixels in the at least one subsequent infrared image having a first variable difference in absorbance that is greater than an allowable variable difference in absorbance for the one or more first pixels in the at least one subsequent infrared image compared to an allowable variable difference in absorbance for the one or more first pixels in the at least one baseline infrared image. Accordingly, an allowable variable difference in absorbance for each pixel can be determined, such as by recording the pixel data for each pixel (e.g., raw pixel data or absorbance pixel data) and determining a distribution of pixel absorbance values for each pixel. The distribution of pixel absorbance values, based on historical pixel absorbance values, can evolve as more pixel data is obtained for each pixel without a gas leak being detected. The distribution of pixel absorbance values can used to set a threshold absorbance for a pixel absorbance, where the threshold absorbance sets an upper boundary for the allowable variable difference in absorbance at higher ambient temperatures (e.g., greater than the polarity switching temperature) or lower boundary for the allowable variable difference in absorbance at lower ambient temperatures (e.g., lower than the polarity switching temperature). The pixel absorbance for each pixel in the subsequent image can be compared to the threshold absorbance so as to be compared to the allowable variable difference in absorbance. Then, pixels in the subsequent image having a pixel absorbance greater than the threshold absorbance are identified as being outside the allowable variable difference in absorbance.

In some embodiments, the system can determine that there are one or more first pixels as being a gas leak based on the first variable difference in absorbance of the one or more first pixels being greater than the allowable variable difference in absorbance of the one or more first pixels in the fixed field of view. As such, pixels having a pixel absorbance that is greater than the threshold absorbance can be identified as being a gas leak due to having the first variable difference in absorbance that is greater than the allowable variable difference in absorbance for each pixel. The pixels having a pixel absorbance that is outside or larger than the allowable variable difference in absorbance can be identified as being a gas from a gas leak.

In some embodiments, the system can generate an alert that identifies a gas leak being present in the fixed field of view. This is done when one or more pixels are identified as having a gas, such as a hydrocarbon gas or carbon monoxide gas.

In some embodiments, the system can perform methods to generate an alert that identifies the presence of a gas leak in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
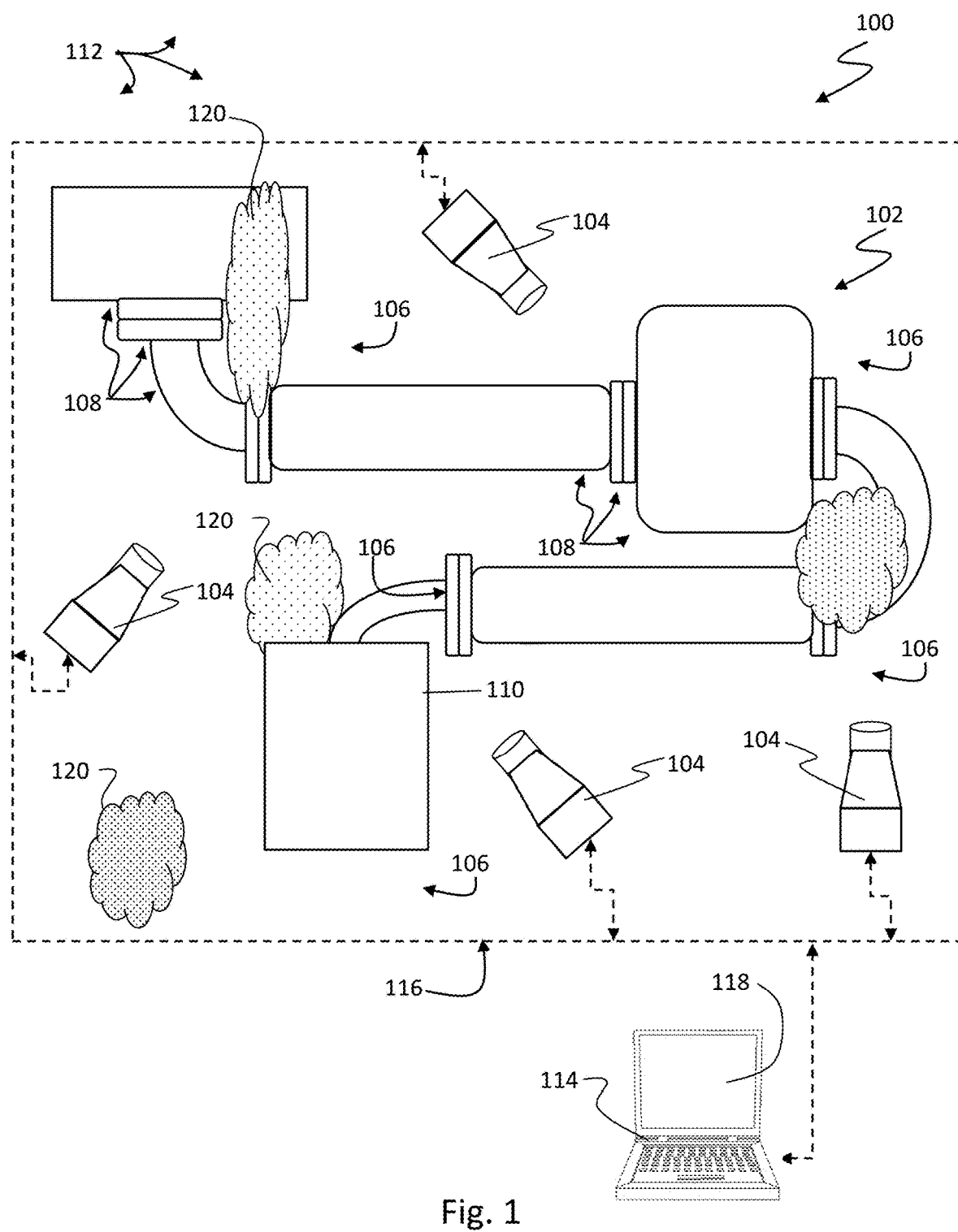
FIG. 1 includes a schematic diagram for a system for monitoring an environment with a set of infrared imaging sensors arranged for monitoring surfaces of components of a gas processing system and the surrounding area.

The features of the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology provides a system and method for detecting a gas leak can include at least one infrared imaging sensor and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect a gas leak. The imaging analysis computer can be configured to detect gas in air or emitting from a surface (e.g., pipe surface, flange, etc.)

where gas should not emit from (or is not present in a baseline) in order to determine that there is a gas leak in the vicinity.

In some embodiments, the system can be an infrared monitoring system. The system can include a thermal imaging device (for example, an infrared (IR) imaging device) and a processor that are collectively configured to monitor environments and detect gas leaks. In some instances, known gas leaks are monitored to detect changes in rate of leak such as increasing leak rate. In some embodiments, the system may monitor a fixed field of view to detect gas in air and separately to detect gas emitting from a containment component. If gas is detected, the system is configured to alert an operator of the system to the presence of the leak (or a potential leak). For example, by actuating an indicator (e.g., a visual alarm or an audio alarm) and/or by communicating to one or more users via an electronic communication channel (e.g., text message, email, telephone call, etc.). In some embodiments, an IR monitoring system (or at least an IR detector sensor or device) may be positioned under pumps, around flanges or connector pipes, or the like in an industrial setting or gas pipeline. In some embodiments, an IR monitoring system may be used to detect gas emitting from junctions or cracks in pipes, or from storage containers.

As used herein, "gas" or any related term refers to an industrial gas, such as a hydrocarbon gas or carbon monoxide gas, but does not refer to air, or the oxygen or nitrogen that make up air.

In some embodiments, a process (or a system) may start with a baseline IR image of the monitored field-of-view (FOV) without a gas being present. The process may analyze all pixels in the FOV for changes from the baseline image to a subsequent image in order to detect a gas based on variable differences in absorbance of IR light in the narrow band of each pixel. The change in absorbance from air (ambient) to gas (e.g., gases in the air) can be an increase in absorbance when the temperature is higher (e.g., above polarity switching temperature) or the change can be a decrease when the temperature is lower than (e.g., below polarity switching temperature). This change refers to the polarity of the absorbance and is temperature dependent based on the ambient temperature and is gas-type dependent. As such, different gasses will have different polarity switching temperatures depending on the environment and temperature that they are in. The polarity switching temperature is when the behavior of the gas goes from absorbing IR light relative to the surrounding air to reflecting IR light relative to the surrounding air. This usually happens at extremely low temperatures, such as below freezing or much lower. As such, at a positive polarity (e.g., above polarity switching temperature), the absorbance may appear as a darker region in the pixels. For a negative polarity (e.g., below polarity switching temperature), the absorbance may appear as a lightened region in the pixels. However, it should be recognized that this absorbance difference variation may be different in different ambient conditions, different geographical locations, different humidity, or different times of the day, month, season or year, which can be accounted for and normalized against in the protocols.

The polarity check can be performed determining a reference background area, such as in the baseline image to track the absorbance thereof during cold ambient conditions. Then, when a region is identified in a subsequent image with an absorbance that is lower than the reference background area and the temperature is within a low range, the polarity check can determine that the condition is below the polarity switching temperature and the regions with absorbance lower than the reference background area are considered to be the gas leak. In most conditions, the absorbance of a gas leak will be higher than the historical reference pixels, but the absorbance of a gas leak may be lower at cold temperatures that cause the polarity switch.

FIG. 1 includes a schematic diagram for a system 100 for monitoring an environment 102 with a set of infrared imaging sensors 104 arranged for monitoring air 106 around components 108 of a gas containing system 110 (e.g., gas system) and the surrounding area of environment 112. The system 100 also includes an image analysis computer 114 operably coupled to the set of infrared imaging sensors 104 through a network 116 (e.g., wired, wireless, optical or any network) represented by the dashed box. This allows for the infrared imaging sensors 104 to send infrared image data over the network 116 to the image analysis computer 114 for analysis.

While FIG. 1 shows four imaging sensors 104 positioned in the environment 102 around the gas system 110, the number of imaging sensors 104 included in the disclosed systems and/or operated in the disclosed methods may vary per embodiment. In some aspects, it may be desirable to achieve 360° coverage of the components 108 in the gas system 110 so as to detect gas 120 in the air 106 or around a component 108 or in various locations to monitor the components 108 as well as the environment 102 (e.g., industrial environment, natural environment, etc.) or surrounding area of environment 112. In some aspects, system 100 can include 4, 5, 6, 7, 8, 9, or 10 or more infrared imaging sensors 104 positioned around a gas system 110. As some components 108 of a gas system 110 may be of substantial height or length, in some aspects, it may be desirable to position a first set of imaging sensors 104 to provide coverage of a first area, and a second set of imaging sensors 104 to provide coverage for a second area. Depending on the length or height of the components being monitored, the number of imaging sensors 104 employed in various embodiments can vary substantially.

The imaging sensors 104 can be any infrared sensor that provides radiometric data that can be used to detect IR light being absorbed by a hydrocarbon gas or a carbon monoxide gas, or other gases. For example, the imaging sensor can be a mid wave cooled IR thermal machine vision camera (e.g., FLIR A6604), which can include streaming an image frequency of 60 Hz (½ window 240 Hz, ¼ window 480 Hz) with windowing, a cooled detector having 640×512 pixels, spectral rage of 3.2 microns to 3.4 microns (e.g., hydrocarbon gas) or 4.5 microns to about 4.7 microns (e.g., for the carbon monoxide gas), thermal sensitivity of less than 20 mK at 30° C., and temperature range over −20 to 350° C. The infrared imaging sensor can produce radiometric images with radiometric data for each pixel. In some aspects, the infrared imaging sensor can detect absorbance/temperature differences as small as 50 mK, which provides accuracy even at longer distances. The infrared imaging sensor can provide 16 bit output. The imaging sensor can provide the radiometric data as or about 327,680 pixels in infrared images with embedded temperature readings with the radiometric images. The radiometric data can be processed in order to determine a temperature for each pixel and/or determine an absorbance value for each pixel. The filter of the infrared imaging sensor can be a cooled filter, in order to measure an absorbance value that is indicative of a gas leak. The data can be linear data, and the linear data can be used to measure relative changes in absorption.

While the arrangement of pixels describes the spatial structure of an image, the radiometric characteristics of each pixel describe the actual information content in each pixel of the image, such as absorbance. Every time an image is acquired on film or by a sensor, its sensitivity to the magnitude of the electromagnetic energy determines the radiometric resolution. The radiometric data can include the color (or black and white, or greyscale) and/or intensity. The intensity is related to the absorbance of the gas, with less intensity indicating more absorbance by the gas. The amount of IR light that is absorbed by the gas shows as the absorbance for that gas in the pixel data.

In some aspects, the radiometric data/images from the infrared sensor (e.g., radiometric IR camera) produces at least 16 bits of infrared data per pixel. These radiometric data/images can be used by the imaging analysis computer reading or recording the 'count' data (e.g., 16 bits) for each pixel, which when converted represents the absorbance of the pixel. This feature of using radiometric data/images provides more information for the present invention compared to IR images that are just JPEG images (e.g., non-radiometric data) from IR cameras that don't contain any thermal data and instead rely on image comparisons to detect change. Instead of analyzing a JPEG or other image, the individual pixels are analyzed as described herein. The network can be configured for at least gigabit Ethernet operations to handle the data from the image sensors.

In some embodiments, discussion of images or infrared images is considered to be radiometric digital data from a mid wave cooled IR camera so that the algorithms process the radiometric digital data. The use of radiometry can use radiation data for each pixel, where the radiometric measurements can be used for reading the intensity of thermal radiation, which can be used for an absorbance determination for each pixel. The radiometric data for each pixel with pixel values correspond to the absorbance of the scene in the field of view. The radiometric data provides a precise absorbance, which allows for external scene parameters to be compensated for emissivity (e.g., a measure of the efficiency of a surface to emit thermal energy relative to a perfect black body source). The user (or imaging analysis computer) may obtain temperature data and/or absorbance data from the radiometric data, as well as maximum absorbance, minimum absorbance, and absorbance standard deviations for user-defined regions (points of interest) for one or more pixels or a plurality of pixels.

Some radiometric IR cameras have the ability to compensate for variations in camera temperature and/or ambient temperature. This allows operators of the systems to receive output from the radiometric IR cameras that has been stabilized and normalized, resulting in temperature-stable images or video. As a result, a scene with a given temperature can correspond to a certain digital value (e.g., absorbance) in the image or video, independent of the camera's temperature. It should be recognized that the IR camera images the surfaces in the fixed field of view, and that the absorption by the gas occurs in the air between the surface and the camera. In some aspects, it can be important to distinguish measurements as surface infrared measurements because radiometric measurements can measure surface temperatures. Metals, and organic material (like people), are usually completely opaque, and radiometric measurements can be able to resolve their surface temperature and IR light emitted therefrom. Remote temperature sensing of a surface relies on the ability to accurately compensate for surface characteristics, atmospheric interference, and the imaging system itself, and the measurement of absorbance also can rely on compensation of surface characteristics. The surface characteristics that influence IR light measurement are surface emissivity and reflectivity at the infrared spectral wavelengths, which can be considered in the algorithms and data processing described herein.

In some aspects, the imaging sensors 104 may be mid wave infrared imaging sensors that provide radiometric data/images in a mid IR bandwidth. Infrared imaging sensors may capture wavelengths of light between about 3.2 microns to about 3.4 microns (e.g., for hydrogen gases) or 4.5 microns to 4.7 microns (e.g., for carbon monoxide gas), and indicate the captured wavelengths in digital image information transmitted over the network 116 to the image analysis computer 114. Upon receiving the digital image information from the imaging sensors 104, the image analysis computer 114 may analyze the image information to determine absorbance information and intensity information for each pixel in the digital image. An operator of the system 100 may establish one or more warning or alert levels for one or more regions of interest (e.g., one or more pixels or combinations of adjacent pixels) within the digital image information of the digital images. The image analysis computer 114 may generate one or more warnings and/or alerts if the established alerting levels are exceeded. This may enable an operator to identify problems with the operation of the gas processing system 110, such as a gas leak, earlier than previously possible, resulting in less damage to the environment 102 or the gas processing system 110 and reduced production outages. Identifying and fixing gas leaks can be economically beneficial to the entity operating the gas processing system 110.

The imaging sensors 104 may include a weatherproof housing (e.g., wind and/or rain tight), which may be configured as spark proof or explosion proof housing. As such, the housing of the shown image sensors may be configured to be explosion proof as known in the art (e.g., solid anti-corroding aluminum construction, epoxy polyester powder paint, germanium window, dust proof, water proof, explosion proof, and optionally with a heater).

FIG. 1 also shows the imaging analysis computer 114 with a display 118 that can provide a user interface for monitoring images from the imaging sensors 104 and data obtained from computations of the digital image information in the images obtained during the monitoring protocols.

Figure 2:
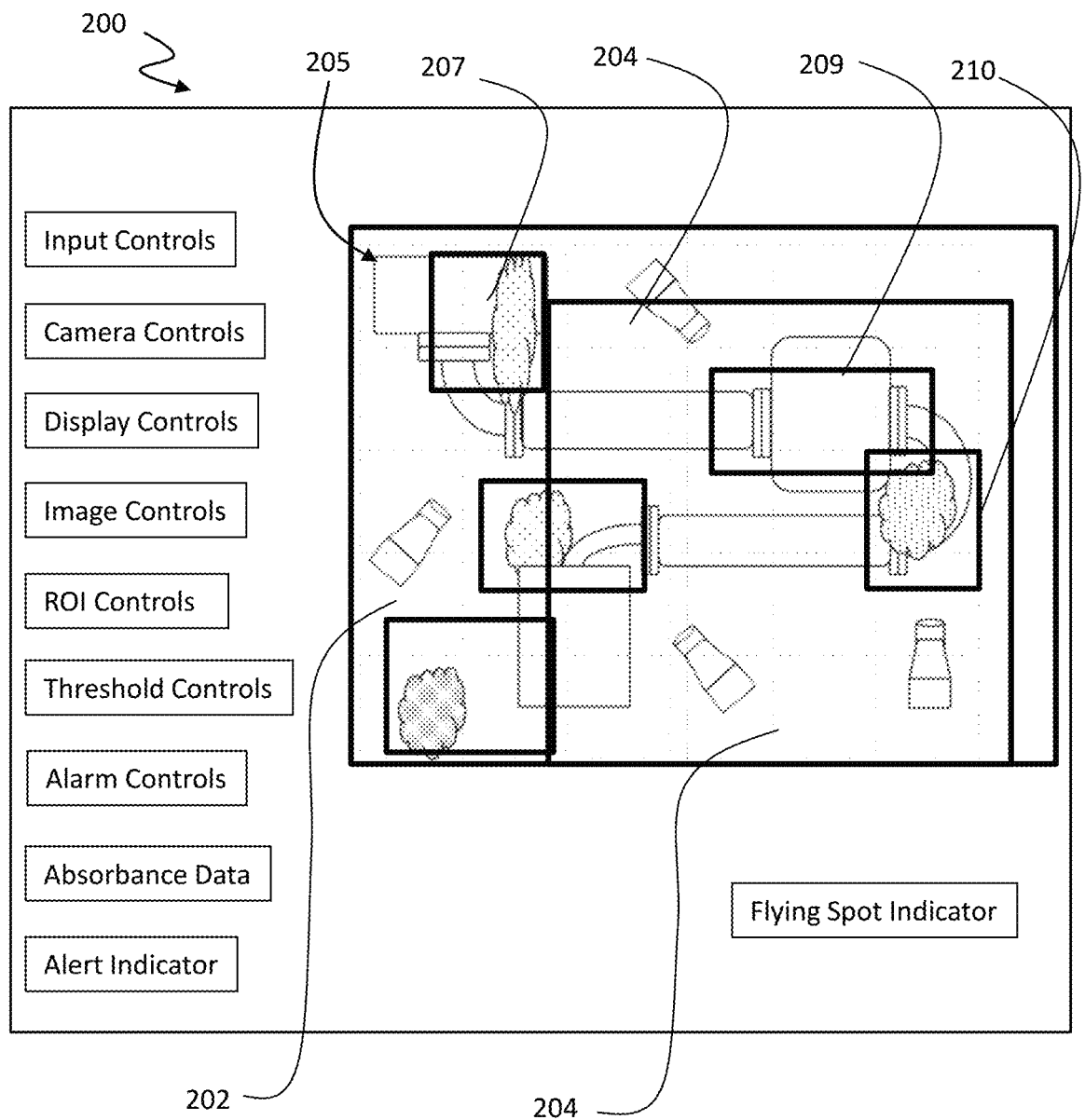
FIG. 2 shows a graphical user interface for monitoring the images obtained from the imaging sensors in order to determine whether or not a gas leak is present in the field of view.

FIG. 2 shows a graphical user interface 200 for monitoring the images 205 obtained from the imaging sensors 104 in order to determine whether or not gas leak is present in the field of view. The data processing protocols can be performed by the imaging analysis computer 114 so that visual information in the graphical user interface 200 can be provided on the display 118 for the operator of the system 100.

The images 205 can be parsed into environmental areas 202 and industrial areas 204. The image 205 can be parsed to show positive control areas 207 with gas leaks and/or negative control areas 209 without gas leaks. Any of these may be labeled as a region of interest 210.

The images 205 can be parsed into one or more regions of interest 210 and identified by boundary indicators, such as a frame or window around each region of interest 210. The regions of interest 110 can be determined by the operator and input into the imaging analysis computer 114, or by the imaging analysis computer 114 analyzing prior selected regions of interest 110 and determining pixels commonly present in the regions of interest 110 to be a region of interest (e.g., based on historical data from images 205).

In some aspects, the image 205 may be received from a single imaging sensor 204, such as at any one of the imaging sensor 104 locations shown in FIG. 1. In some aspects, the image 205 may be generated by stitching together two or more images from two or more imaging sensors 104, such as any two or more of infrared imaging sensors or infrared imaging sensors combined with visible spectrum cameras. The image or video stitching of images from multiple imaging sensors may be performed by any of the methods known in the art. For example, in some aspects, OpenCV may be used to perform video stitching. Some aspects may utilize Video Stitch Studio by Video Stitch of Paris, France. Other aspects may use other methods.

The graphical user interface 200 can include input controls, camera controls, display controls, image controls, region of interest (ROI) controls, threshold controls, and alarm controls in order to allow the operator to control substantially any aspect of the monitoring protocol. The operator can: select which camera or combinations of cameras are being displayed by the input controls, select the field of view with the camera controls, select how the image from the camera looks on the display with the display controls, select the scaling or other image adjustments with the image controls, select various ROIs with the ROI controls, select absorbance thresholds for one or more pixels or groups of pixels in the images with the threshold controls, and select one or more alarm levels and alarm display types (e.g., audible and/or visible) with the alarm controls. Over time, the data input into the graphical user interface 200 can be monitored and registered with the imaging analysis computer 114, and the input data can be analyzed to determine an automated operating protocol that is performed automatically by the imaging analysis computer 114 based on historical operations. The operator can adjust any operational parameter on the fly to update the automated operating protocol.

In some embodiments, the graphical user interface 200 also includes a scale indicator, a warning threshold control, and an alert threshold control. The scale indicator determines a graphical resolution of surface temperature ranges rendered within a region of interest of the image 205. For example, a smaller or narrower temperature and/or absorbance range may provide an image that can communicate more fine detail between pixel data (e.g., temperature, absorbance, etc.) of the image (e.g., between surface with or without gas). The graphical user interface 200 can include an option for the imaging analysis computer 114 to show the gas leak source, and provide the option to reset leak source (e.g., once contained).

The graphical user interface 200 can be operated by the warning and alert threshold controls an operator to set independent thresholds for warning indicators (e.g., possible gas leak) and alert indicators (e.g., gas leak detected).

The graphical user interface 200 can also include an absorbance variance status indicator, which can be shown as a probability of gas in a region of interest. The gas presence status indicator can include a minimum, maximum, and average absorbance variance (e.g., shown as probability of gas) currently detected within selected regions of interest 210, such as a known area without gas leaks and a problem area with prior gas leaks (e.g., flange junction, joints, etc.) The alert window shows alerts when the minimum, maximum, or average absorbance variance (e.g., shown as probability of gas) shown in the status indicator have exceeded either of the warning or alert thresholds. Different flashing lights (e.g., different color), alarm sounds (e.g., different volume or sound pattern or word notifications via speakers), or combinations may be provided.

The graphical user interface 200 can also include a flying spot indicator. The flying spot indicator provides an indication of absorbance, absorbance variation, or probability of gas at a position (or pixel) in the image 205 that a pointing device may be hovering over.

Each region of interest 210 may include its own separate parameters, such as a scale indicator, warning and alert thresholds, absorbance variance status, probability of gas indicator, and others. By selecting each of the regions of interest 210 individually, the display of the graphical user interface 200 may switch so as to display parameters corresponding to the selected region of interest. To edit one or more parameters for a region of interest, the region of interest is selected, for example, via a pointing device such as a mouse by clicking on the region of interest 210. The parameters corresponding to that selected region of interest are then displayed, and may be edited directly via the graphical user interface 200.

As discussed above, in some aspects, the image 205 may be generated by stitching together images captured by multiple imaging sensors 104. Graphical user interface 200 can be modified providing for the management of images from multiple imaging cameras 104. A graphical user interface 200 can include a camera selection field, region name field and link to region field. The camera selection field allows a user/operator to select between a plurality of imaging sensors, such as imaging sensors 104, that may be under control of, for example, the image analysis computer 114. When a particular imaging sensor 104 is selected in the camera selection field, the image 205 shown in the graphical user interface 200 may be received from the selected camera. In a particular embodiment, each region of interest shown in the image 205, such as the regions of interest 210, may be imaging sensor specific. In other words, the system 100, or more specifically the image analysis computer 114, may maintain separate parameters for each imaging sensor 104 utilized by the system 100. The separate parameters may include the number, names (see below) and configurations of regions of interest for each imaging sensor, warning and alert levels for each region of interest, and any linking between regions of interest, both within an image captured by one imaging sensor or across multiple images captured by multiple imaging sensors. A list of imaging sensors available for selection in the camera selection field may be generated based on configuration data providing the list of imaging sensors and indications of how imaging data may be obtained from the listed imaging sensors.

The region name field allows each region of interest 210, such as those with common gas leaks or known small leaks, to be named by an operator to allow for easy tracking and monitoring. The value in the region name field may change as each region of interest 210 is selected so as to display a name associated with the selected region of interest. Thus, region name field may be a read/write field, in that a current value is displayed but can be overwritten by an operator, with the overwritten value becoming the new current value. Regions that may not have gas can be named as controls so that the temperature and/or absorbance variance is determined with known areas without gas.

Figure 6:
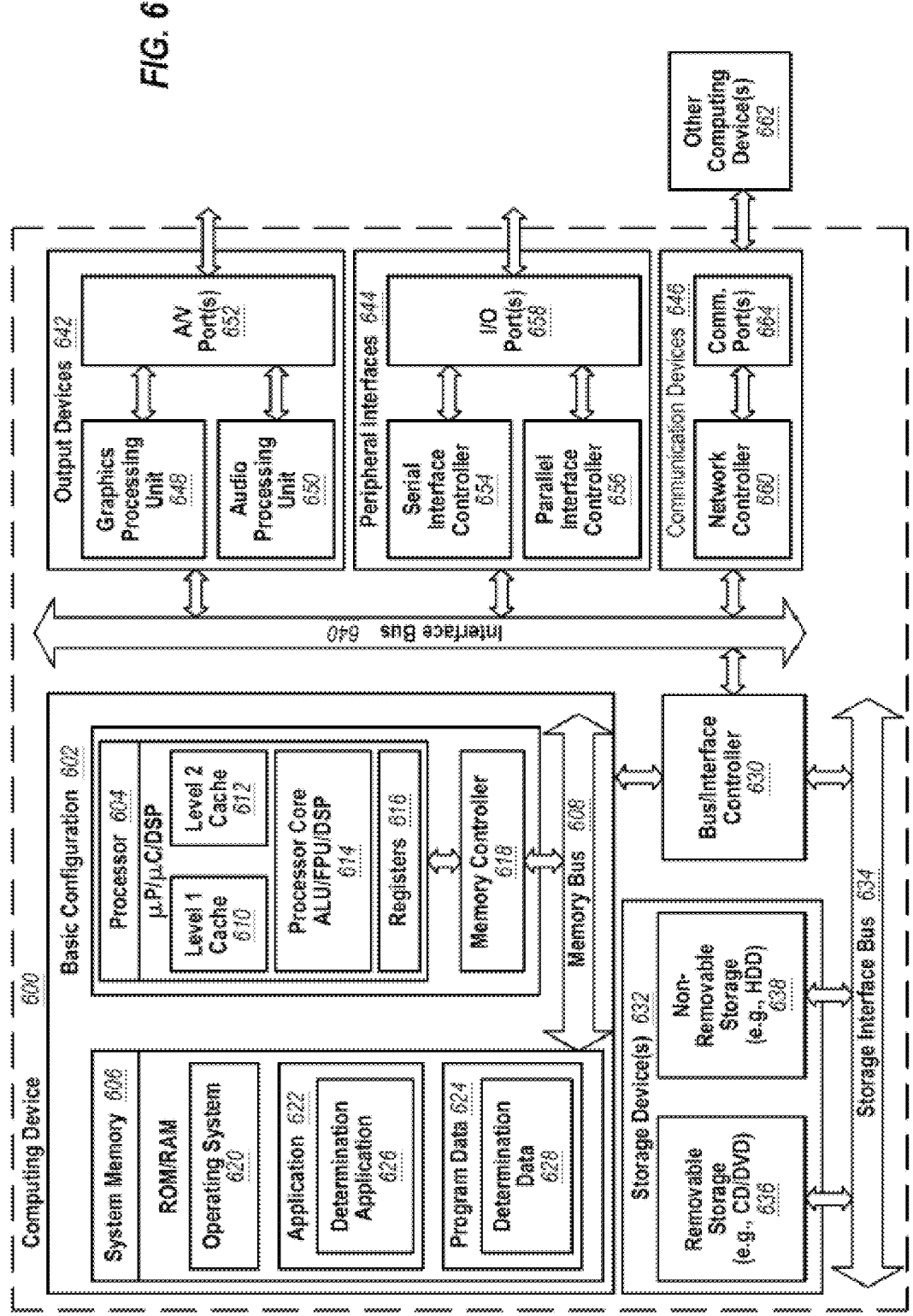
FIG. 6 shows an example computing device (e.g., a computer) that may be arranged in some embodiments to perform the methods (or portions thereof) described herein.

The image analysis computer 114 can be provided in various configurations from standard personal computers to cloud computing systems. FIG. 6, described in more detail below, provides an example of an image analysis computer 114, and includes the features of a standard computer. The image analysis computer 114 may communicate with the imaging sensors 104. For example, the image analysis computer 114 may be configured to transmit one or more configuration parameters to one or more of the imaging sensors 104, and command the imaging sensors 104 to capture one or more images. The image analysis computer 114 may further be configured to receive digital images from the imaging sensors 104, capturing different perspectives of a scene or environment.

The image analysis computer 114 may store instructions that configure the processor to perform one or more of the functions disclosed herein. For example, the memory may store instructions that configure the processor to retrieve an image from the imaging sensor(s) 104 and display the image on the electronic display 118. The memory may include further instructions that configure the processor to define one or more regions of interest in one or more images captured by one or more imaging sensors 104, and monitor absorbance, absorbance variances or possibility of gas being present in the regions of interest through successive images captured from the imaging sensor(s) 104. In some aspects, the memory may include instructions that configure the processor to set warning and/or alert threshold values for absorbance values within one or more regions of interest defined in the image(s) of the scene or environment or defined or fixed fields of view of each camera, and generate warnings and/or alerts that gas may be present or is present when those threshold values are exceeded. The radiometric data of each pixel can be stored in a database, and may be analyzed and compared to baseline radiometric data by the imaging analysis computer in order to detect absorption that indicates the presence of a gas leak.

Figure 3:
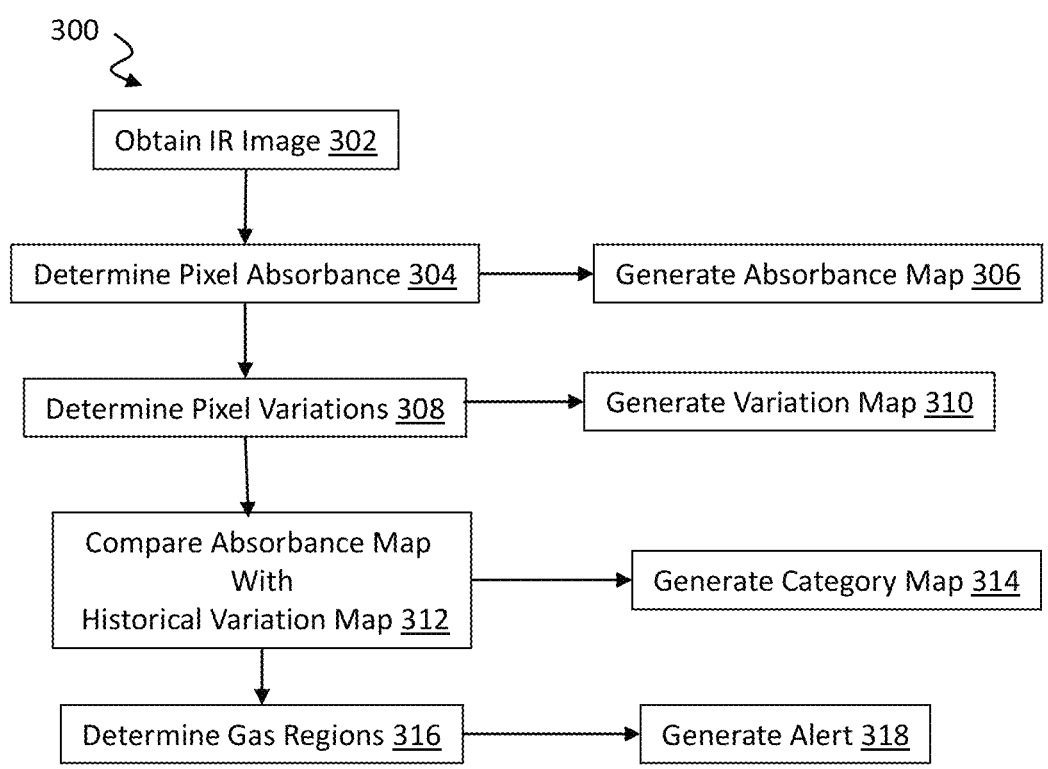
FIG. 3 is a flow chart of a process of one exemplary embodiment of the methods for detecting a gas leak that can be performed by the embodiments of the systems disclosed herein.

FIG. 3 is a flow chart of a process 300 of one exemplary embodiment of the methods for detecting a gas leak that can be performed by the embodiments of the systems disclosed herein. The process can include obtaining an IR image (step 302) from the image data from the image sensors 104, which can be stitched together to form an image 205. In some aspects, the image 205 may be generated based on image data from only a single imaging sensor, or more than two imaging sensors. The image 205 includes an array of pixels, each pixel having a pixel value. Each pixel value represents light captured at a position corresponding to the pixel's location within the pixel array, where more light received indicates less absorption by a gas in the air and less light received indicates more absorption by a gas in the air. The field of view may be fixed, and thereby each pixel can have a defined pixel location in the array that corresponds to a surface of the field of view and the air or gas between the surface and the camera. The image 205 is then processed to determine pixel absorbance values (step 304), which determines absorbance for each pixel based on the pixel values in the image 205. The process can create an absorbance map for each image or for a sequence of images (step 306). In some aspects, for each pixel value in the image 205, there is a corresponding absorbance value in the absorbance map. The process can analyze the absorbance values included in the absorbance map across at least two images (e.g., a baseline image and subsequent image) (step 308) in order to identify an absorbance variance for each pixel to produce an absorbance variation map (step 310). This provides a range of historical absorbance, a historical absorbance variance, over time to show how the absorbance of each pixel can vary over time when there is no gas leak for the pixel. For example, a first pixel may represent a first surface and the air between the first surface and camera, and the absorbance by the air or gases in the air can vary due to changing ambient temperatures, such as throughout the day, or across weeks, months, or seasons. The absorbance is allowed to vary without there being an indication of a gas leak, such as by varying within an allowable variation in absorbance values. The historical variation of pixel absorbance values for each pixel are aggregated to produce a historical absorbance variation map (step 310) that includes an allowable range of absorbance for each pixel.

The absorbance variation map may include a value or range of values for each absorbance variation for each pixel in the absorbance map. As such, the historical variation map shows the historical absorbance variation over a time period. The absorbance map, for a current IR image, is then compared to the historical variation map, such as by each pixel in the absorbance map being compared to the corresponding pixel in the historical variation map (step 312). The comparison results in the current absorbance for a pixel being less than, the same, or greater than a value in the historical variation map to generate a category map (step 314). When the current absorbance for a pixel is greater than a value in the historical variation map, the pixel is categorized as abnormal (e.g., a gas leak) in the category map. Otherwise, when the current absorbance is less than or the same as the values in the historical variation map, the pixel is categorized as normal (e.g., not a gas leak). Each value in the category map may indicate whether a corresponding absorbance value in the absorbance map is within a normal range or is categorized as abnormal with respect to the historical variation map, which includes data for each pixel for the allowable variation in absorbance. When categorized as abnormal, the process can determine whether there is a gas leak region by linking adjacent pixels that are categorized as abnormal (step 316). After the category map is generated one or more abnormal regions are determined to be gas leak regions by processing the data. Based on the abnormal regions being gas leak regions, the process 300 can generate one or more alerts (step 318). While process 300 is serialized in the preceding discussion, one of skill in the art would understand that at least portions of process 300 may be performed in parallel in some operative embodiments.

Figure 4:
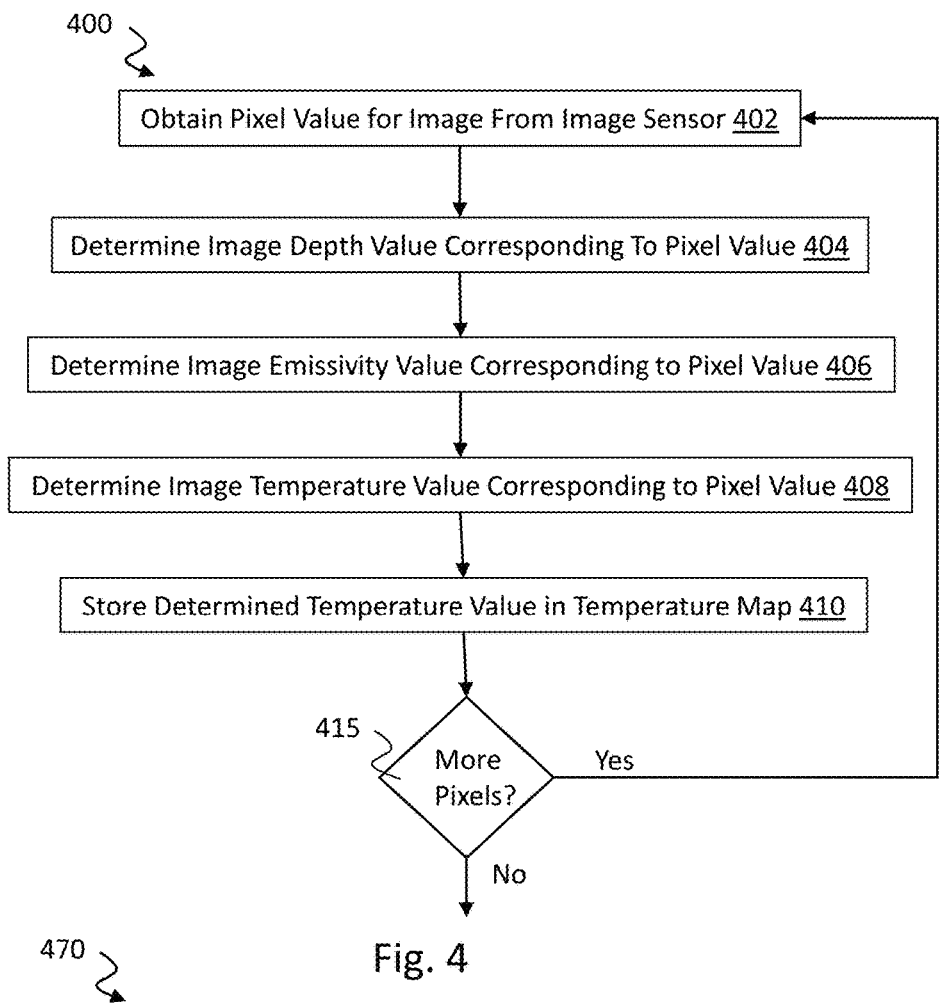
FIG. 4 is a flowchart of a process of one exemplary embodiment of a method for determining absorbance values for pixels in an infrared image that can be performed by the embodiments of the systems disclosed herein.

FIG. 4 is a flowchart of a process 400 of one exemplary embodiment of a method for determining absorbance values for pixels in an infrared image that can be performed by the embodiments of the systems disclosed herein. In block 402, a pixel value for an image from an infrared sensor is obtained. In some aspects, the image may be captured from one of the imaging sensors 104, discussed above with respect to FIG. 1. In some aspects, one or more of the imaging sensors 104 may record absorbance of IR light in the narrow band and represent the captured light as a digital image. The pixel value received in block 402 may be one pixel value from an array of pixel values included in the captured image.

In block 404, a depth value corresponding to the pixel value is obtained. In some aspects, the depth value may be obtained from a depth map of the image. The depth map may be obtained, in some aspects, via a ranging device, such as a radio detection and ranging (RADAR) or light and radar or LIDAR device. In some aspects, the depth map may be obtained using structured light.

In block 406, an emissivity value corresponding to the pixel value is obtained. In some aspects, the emissivity value may be based on a setting of the imaging sensor referenced in block 402. For example, in some aspects, the imaging sensor may be configured to capture objects of a given emissivity. This emissivity value may be used in block 406. In some aspects, an object database may include emissivity of known objects. In some aspects, an emissivity value of an object being searched for in the image may be used. For example, in some aspects that may be imaging a steel pipe, an emissivity of steel may be used. As such, emissivity for various objects (e.g., from surface of the object) can be obtained, where the objects can be natural plants in the environment or concrete, gravel, metals, plastics or other industrial surfaces. The emissivity of different types of gas may also be obtained for the data analysis so that gas can be identified as well as the viscosity of the gas being identified. This can allow for determining the type gas. This emissivity value may be configured by an operator in some aspects.

In block 408, an absorbance value corresponding to the pixel value is determined based on the corresponding depth value and emissivity value, as well as other parameters. In some aspects, block 408 may include translation of a raw value from the imaging sensor into a power value for the absorbance. For example, in some aspects, the imaging sensor may provide imaging values in digital numbers (DNs).

In some embodiments, the camera provides the absorbance for each pixel.

In block 410, the determined absorbance value is stored in an absorbance map. The absorbance map may be used as input for one or more of the processes discussed below. An absorbance map may be a data structure that stores absorbance values for at least a portion of pixels in an image or region of interest. In some aspects, the absorbance map may be stored in the memory of the image analysis computer 114.

Decision block 415 determines whether there are additional pixels to process in the image (or region of interest). If there are additional pixels, processing returns to block 402. Otherwise, processing continues in order to determine whether or not gas is present in any of the images.

Figure 4A:
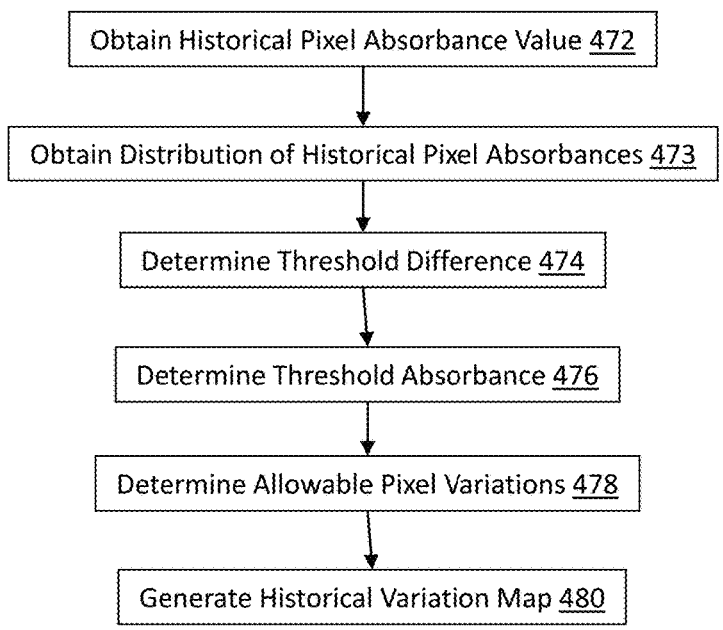
FIG. 4A includes a flow chart of a process of generating a variation map for the variation in absorbance values for each pixel.
Figure 4A:
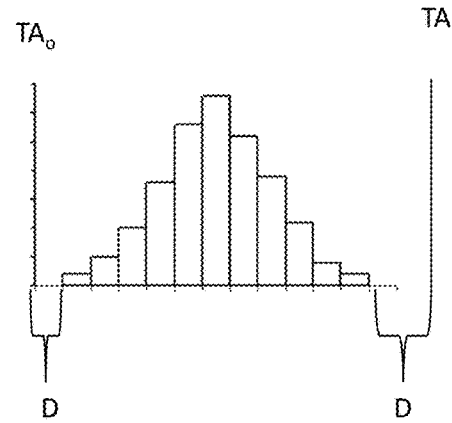

FIG. 4A includes a flow chart of a process 470 of generating a historical variation map for the variation in absorbance for each pixel. The process 470 can include obtaining a plurality of historical pixel absorbance values for a first pixel (step 472). The plurality of historical pixel absorbance values for a first pixel are grouped in a distribution of historical pixel absorbance values for the first pixel (step 473). A threshold difference (D) is determined based on the distribution of historical pixel absorbance values (step 474), wherein the threshold difference D is the maximum allowed difference from the distribution of historical pixel absorbance values that the pixel can have based on the historical absorbance data for that pixel. The threshold difference D is then combined with the distribution of historical pixel absorbance values to determine the threshold absorbance (TA) (step 476). The threshold absorbance TA is then combined with the distribution of historical pixel absorbance values to determine an allowable difference in absorbance, which allowable difference in absorbance is set as the historical variance in absorbance (step 478). The historical variation map can then be prepared to include the allowable difference in absorbance values or the historical variance for each pixel (step 480). The process can analyze the absorbance values included in the absorbance maps across at least two images, and preferably across a plurality of images over time, in order to identify a historical absorbance variance for each pixel (step 308). This provides a range of historical absorbance values, a historical absorbance variance, over time to show how the absorbance of each pixel can vary over time when there is no gas leak for the pixel. For example, a first pixel may represent a first surface and air, and the temperature of that surface and air can vary due to changing ambient temperatures, such as throughout the day, or across weeks, months, or seasons, which can change the absorbance of that pixel. The absorbance is allowed to vary without there being an indication of a gas leak, such as by varying within an allowable variation in absorbance values. The historical variation of pixel absorbance values for each pixel are aggregated to produce a historical absorbance variation map (step 310) that includes an allowable range of absorbance for each pixel. The absorbance variation map may include a value or range of values for each absorbance variation for each pixel in the absorbance map. As such, the historical variation map shows the historical absorbance variation over a time period.

Lower amount light received by the pixel produces a lower value, and thereby the lower the count value the higher the absorption, therefore darker pixels show more absorbance. Therefore, under the terminology used herein, more absorbance is a darker pixel with a lower count value, so indicating a higher absorbance indicates a lower count value. The lower count value can be converted to an absorbance value, as a maximum absorbance value has a minimum count value, and a minimum absorbance has a maximum count value. As such, graphing absorbance, as in FIG. 4A, absorbance increases from left to right, and thereby more absorbance or a higher absorbance value compared to the distribution and the difference D. However, it should be recognized that based on the raw count value, a lower count value indicates more absorbance because less light is received, and the relationship is indicating an abnormal pixel when the pixel count value is lower than a historical pixel count value distribution, such as by a difference D. The $TA_o$ indicates saturation as there is no pixel count value due to absorbance, which may be used when referencing by pixel count value rather than absorbance (e.g., TA, which may be saturation). Also, the distribution can be any distribution (e.g., normal Gaussian) and the measurement to the difference D may be an average, mean, center, edge, or other defined part of the distribution.

Figure 4B:
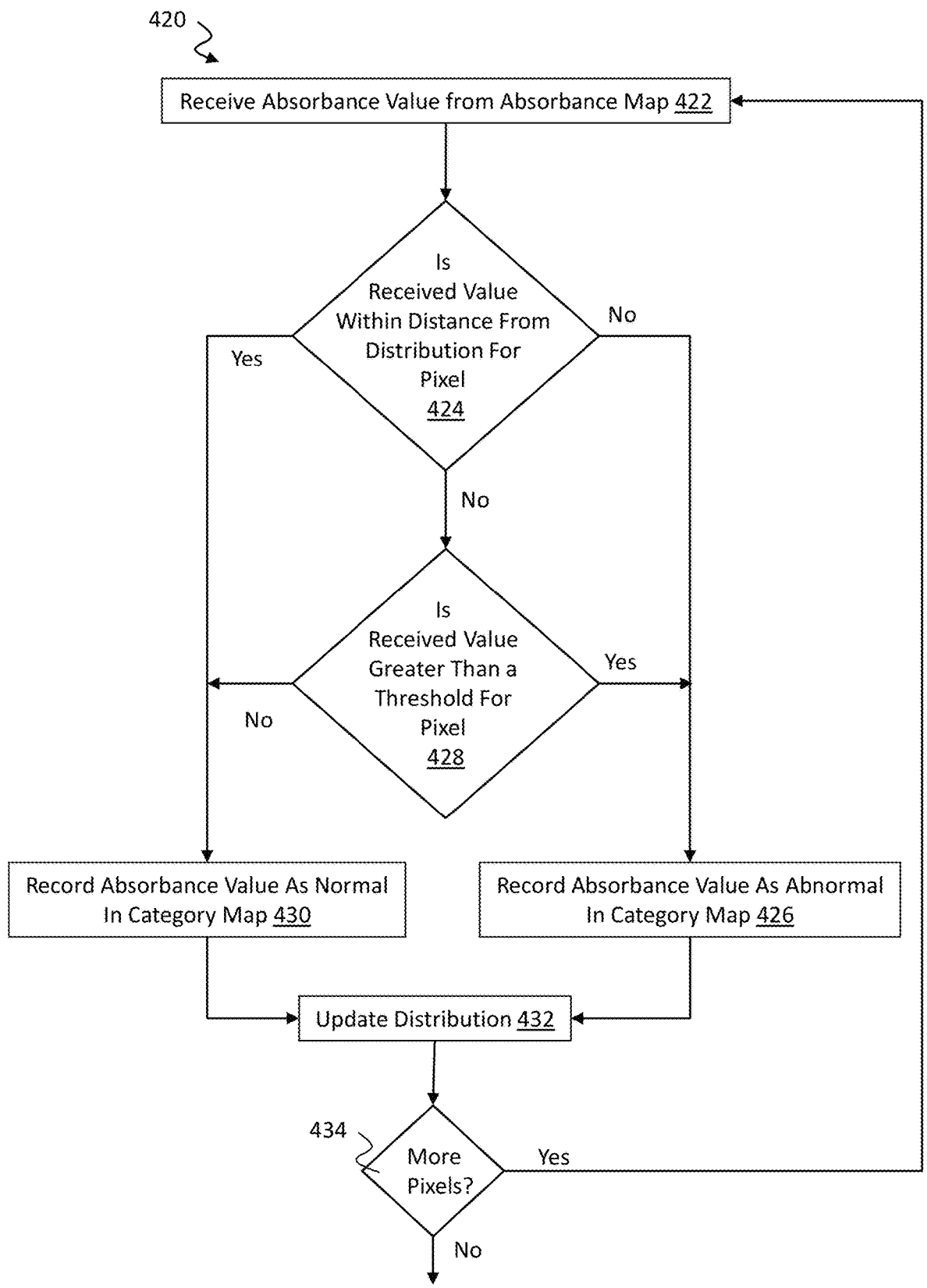
FIG. 4B includes a flow chart of a process of generating a category map for the identification of the category each pixel absorbance value falls within, either abnormal (e.g., gas leak present) or normal (e.g., no gas leak).

FIG. 4B includes a flow chart of a process 420 of generating a category map for the current absorbance for each pixel based on the historical variation of each pixel. The historical variation map may indicate acceptable ranges of pixels that are within a normal range (e.g., not gas leak) and unacceptable ranges of pixels that are outside the normal range (e.g., gas leak present). The pixels outside the normal range can be analyzed to determine whether or not they include a gas leak.

In the illustrated embodiment, process 420 utilizes two different approaches to determine whether a pixel is within a "normal" absorbance range. A first approach compares an absorbance value to a statistical distribution of pixel absorbance values based on historical values for the same pixel to determine an absorbance variance (e.g., historical variation map). In most embodiments, a first pixel or first group of pixels is compared to the same first pixel or group of pixels to determine if the current absorbance is within the historical absorbance variation (e.g., not gas leak) or outside the historical absorbance variation (e.g., gas leak present). In some instances, this protocol can also include comparing a first pixel (or first group of pixels) to a second pixel (or second group of pixels) by comparing the pixel values (absorbance) as well as comparing the pixel variations (absorbance variance) between two regions. Pixels with larger variances compared to the historical variation map over time can indicate the presence of a gas leak. To the extent the absorbance value is within a specified distance (e.g., threshold difference "D") from a distribution of absorbance variances, the pixel may be considered within a "normal" range. However, in a scenario that includes absorbance changing gradually over time, such as from throughout the day, process 420 may not detect a pixel that indicates a higher absorbance rating using this first technique, as the higher absorbance may gradually become a new "normal", as the higher absorbance may change the nature of the distribution over time (e.g., over a day, week, month, season, year, etc.). To avoid this possibility, process 420 may compare the absorbance value or absorbance variation for a first pixel across multiple images to a threshold value that defines a maximum value of normal, regardless of historical values. By combining a comparison to historical values and to a threshold value, process 420 provides a robust characterization of a current absorbance value as either "normal" or "abnormal."

In block 422, an absorbance value (e.g., absorbance variance value) for at least one pixel is received from an imaging sensor or from the absorbance map. In some aspects, the imaging sensor may capture infrared wavelengths of light and convert the captured light into digital data which forms an array of absorbance values, with a pixel absorbance value for each pixel. The pixel absorbance value received in block 422 may be one absorbance value (absorbance variation) of one pixel in the array of absorbance values (absorbance variation) of a plurality of pixels.

Block 424 determines whether the pixel absorbance value (e.g., absorbance value variation) is within a specified distance (e.g., threshold difference "D") from a statistical distribution of pixel absorbance values or absorbance value variations for each pixel. The statistical distribution may be based on historical values of each pixel. In some aspects, the specified distance from the distribution is a Mahalanobis distance. For example, in some aspects, if the squared Mahalanobis distance is greater than the inverse chi squared cumulative distribution function at a specified probability (e.g. 0.99), then it is within the distribution. Otherwise, it is outside of the distribution in some aspects.

In some aspects, block 424 may make different determinations. For example, in some aspects, block 424 may determine whether the temperature value (e.g., temperature variation for pixel) is within a distance representing 90%, 95%, or 99% of the statistical distribution. If the received value is not within the specified distance from the distribution, process 420 moves to block 426, which marks the pixel as abnormal in a pixel map (e.g., category map).

If the absorbance value is within the specified distance from the distribution, process 420 moves from decision block 424 to decision block 428, which determines whether the pixel absorbance value is above a threshold value (e.g., a set threshold absorbance value, which may or may not be the same as the absorbance of the threshold difference D). This determines whether the absorbance variation is greater than a threshold absorbance variation for each pixel. The threshold value referenced in block 428 may be based on operator configured information, as a set value, or determined over time based on historical information. The configured information may be specific to an image (generated by a single imaging sensor or generated by stitching together data from multiple imaging sensors), or a region of interest within an image. If the absorbance value is above the threshold value, process 420 moves to block 426, which marks the pixel absorbance value as abnormal (e.g., in category map) as discussed above.

Otherwise, if the absorbance value is within the distance D from the distribution for the pixel in step 424 or is not greater than the threshold value in step 428, process 420 moves to block 430, which records the absorbance value as normal in the category map.

Due to the historical nature of the data that defines the distribution and thresholds for absorbance, the distribution can be updated with the new data, such as when the new data is marked as normal. The distribution is not updated when the pixel absorbance value is identified as being abnormal.

After the distribution is updated in block 432, process 420 moves to decision block 434, which determines if there are more pixels in an image to process. If there are, process 420 returns to block 422 and processing continues. If there are no more pixels, processing may continue for determining whether there is a gas leak in the images.

The absorbance (i.e., "counts") difference from the reference background has to be large enough that it triggers as a variation. This is where the sensitivity factor is considered in the algorithm, where the higher the sensitivity, the lower the difference (e.g., difference "D") between the current pixel absorbance value and the reference background pixel absorbance value is required in order to be considered as a potential gas pixel (e.g., abnormal). As such, the determination of a gas pixel based on the difference in absorbance for a pixel compared to the allowable distribution of pixel absorbance values is not a simple fixed-threshold relationship, but is based on whether the difference D falls outside the expected variance observed on that pixel over time. However, some embodiments use the fixed-threshold to determine normal pixels from abnormal pixels. A low number of counts is a darker pixel, and a higher number of counts is a lighter pixel. At most operating temperatures, the darker a pixel is the more absorption there is.

Figure 4C:
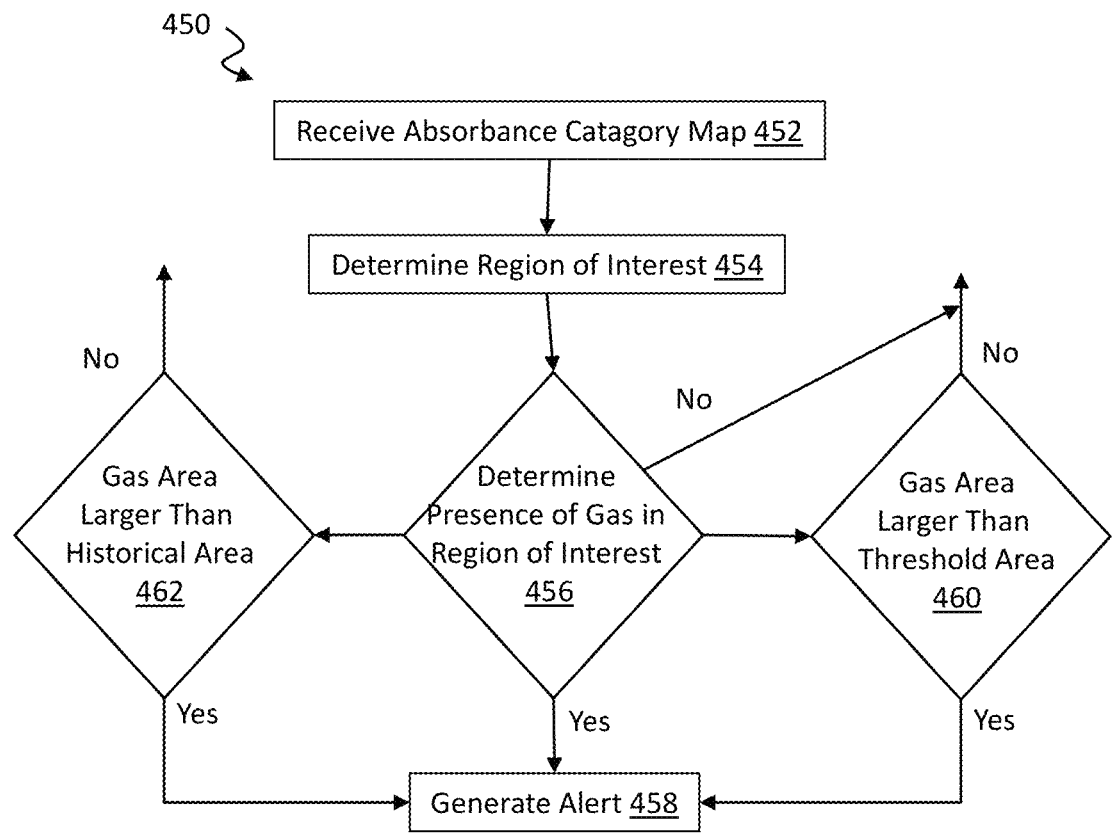
FIG. 4C includes a flow chart of a process of generating an alert based on an abnormal region of pixels that are identified as being a region of gas.

FIG. 4C includes a flow chart of a process 450 of generating an alert based on an abnormal region of pixels that are identified as being a region of a gas leak. In block 452, the absorbance category map is received indicating normal and abnormal absorbance values for each pixel within the image. For example, in some aspects, a category map may represent a matrix or two dimensional array of true/false or 1/0 values, with a true/1 value in a position of the category map indicating a pixel located at a corresponding position of the image is abnormal, while a false/0 value in a position of the category map indicates an absorbance or absorbance variance located at a corresponding pixel position of the image is normal. In some aspects, the meaning of these values may be reversed. In some aspects, the category map received in block 452 may be generated by process 420, discussed above with respect to FIG. 4B.

In block 454, a region of interest with one or more abnormal pixels within the image is determined. The region of interest may be determined in some aspects, by selecting one or more pixels of a previously identified regions of interest. A region of interest can be any region in the environment that is more susceptible to having a gas leak. The region of interest may also be selected in real time based on an area of abnormal pixels that are adjacent to each other. In some aspects, the region of interest may encompass a subset of all the pixels in an image. In some aspects, the region of interest may be defined by an operator, for example, by operating a pointing device such as a mouse or touch screen, as well as interacting with the graphical user interface 200 to identify a portion of the infrared image 205. A region of abnormal pixels may be identified by connecting a region of contiguous or near contiguous abnormal pixels.

Decision block 456 determines whether a gas leak was determined to be present in the region of interest, where the gas leak can be a region of abnormal pixels or region of interest in block 454. If no gas leak in the region of interest is identified, then process 450 continues processing. If a gas leak region is identified in block 456, then process 450 can make different decisions. One decision is that if there is any gas or gas leak detected in the images, then the process moves to block 458 and an alert is generated. However, the system can be configured to compare any detected gas (e.g., pixel having gas absorption) to historical values for the pixel(s) or to threshold values before generating an alert.

In one option, when a gas leak is determined to be present in the pixels of a region of interest (e.g., when the region of interest is partially or entirely a gas), the size of the area of the region of interest (e.g., size of the area of pixels identified to be a gas) is determined and compared to a threshold area size as shown block 460. When the size of the area of the gas is greater than a threshold area size, then the process 450 generates the alert 458. When the size of the area of the gas is less than a threshold area size, then the alert is not generated and monitoring for a gas leak or monitoring the size of the region of a gas leak continues.

In another option, when a gas leak is determined to be present in the pixels of a region of interest (e.g., when the region of interest is partially or entirely gas), the size of the area of the region of interest (e.g., size of the area of pixels identified to be gas) is determined and compared to a historical area size as shown block 462. The historical area size can include an average of historical area sizes for a particular gas leak region or averaging across particular gas leak regions. For example, the gas leak region may be small with a low rate of increasing area size, the protocol determines whether the current gas leak region is above the historical area sizes or a size that is too different (e.g., difference, or change in size) from the historical area size. When the size of the area of the gas leak is greater than this historical area size or a value to much higher than the historical area, then the process 450 generates the alert 458. When the size of the area of the gas leak is within the historical area size range or close to the historical area size (e.g., within a distance/value from the average or range), then the alert is not generated and monitoring for gas or monitoring the size of the region of gas continues.

Also, a size of the identified gas region can be compared to a predetermined percent of a region of interest. In some aspects, the percent of the region of interest may be 1%, 2%, 3%, 4%, 5%, 6%, 7%, 8%, 9%, 10%, 15%, 20%, 25%, 30%, 33%, 35%, 50%, 75%, or 100% of the region of interest. If the area of the gas region is larger than the predetermined percent, process 450 moves to block 458 where an alert is generated.

Some aspects of block 458 may utilize different conditions for generating an alert than those described. For example, in some aspects, an absolute size of the gas region (number of adjacent pixels) may be used to determine if an alert should be generated, either to the exclusion of or in conjunction with the size of the gas region relative to a size of the region of interest.

In some embodiments, the process may calculate an aggregated "normal" absorbance (e.g., absorbance variation across images) for pixels within the abnormal region (e.g., gas region) and an aggregated absorbance variation within the region of interest. If a distance between the aggregated normal absorbance variance and aggregated measured absorbance variance is above a threshold, an alert may be generated in some aspects. For example, some aspects may include selecting a nominal or normal absorbance variation from the distributions for each of the pixels in the abnormal region. These nominal values may then be aggregated. Similarly, the measured absorbance and absorbance variations within the abnormal region may be separately aggregated. This aggregate of measured absorbance or absorbance variations represents an aggregated variance for the abnormal region. If the measured variance is substantially (represented by the threshold) above a normal variance for the abnormal region, an alert may be generated. This technique considers a situation where none of the pixels within the abnormal region may be above a warning or alert threshold, and thus, no alert is generated based on these thresholds. Additionally, the abnormal gas region may be a relatively small portion of the region of interest, such that no alert is generated. However, given the number of pixels (within the abnormal gas region) that are above their nominal or normal points, (i.e. the variance of the abnormal gas region), there may be cause for concern such that an alert is proper.

In some aspects, generating an alert may include displaying a message on an electronic display, such as a system control console. In some other aspects, generating an alert may include sending an email, text message, or writing data to a log file, or any combination of these.

In some embodiments, a system for detecting a gas leak can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect a gas leak. The imaging analysis computer can be configured to detect a gas leak where gas should not be (or is not present in a baseline) in order to determine that there is a gas leak in the vicinity.

In some embodiments, the system can be configured to obtain at least one baseline infrared image of a fixed field of view without a gas leak being present. The baseline image can be updated over time prior to a gas leak being detected in the fixed field of view. The baseline image can be an image from an imaging sensor, or a historical composite of pixel data from a plurality of baseline images over time. This allows for comparisons between images with no gas leak and images that have a gas leak. In some instances, the at least one baseline image is the historical variation map, or the one or more images used to prepare the historical variation map. The at least one baseline infrared image can be a single image when representing the baseline for each pixel without a gas leak. However, the at least one baseline image can be a plurality of images, or a composite prepared from a plurality of images so as to have the distribution thereof (e.g., historical variation map). The at least one baseline infrared image can provide the threshold difference and threshold absorbance as well as the allowable pixel variations for each pixel.

In some embodiments, the system can perform methods to analyze all pixels in the fixed field of view for changes from the at least one baseline infrared image to at least one subsequent infrared image. The changes can be in the pixel data for each pixel, such as changes in the absorbance of the infrared light that indicates changes in air composition, which can indicate a gas leak that is leaking gas into the air.

In some embodiments, the system can perform methods to identify variable differences in absorbance for each pixel in the field of view between the at least one baseline infrared image and the at least one subsequent infrared image. The variable difference can be determined by assessing changes in a specific pixel (e.g., pixel location in the pixel array of the imaging device) from a baseline image to a subsequent image.

In some embodiments, the system can perform methods to identify one or more first pixels in the at least one subsequent infrared image having a first variable difference in absorbance that is greater than an allowable variable difference in absorbance for the one or more first pixels in the at least one subsequent infrared image compared to an allowable variable difference in absorbance for the one or more first pixels in the at least one baseline infrared image. This protocol can be performed as described in connection to FIG. 4B. Here, the one or more first pixels are identified because they have pixel absorbance values that are identified as being abnormal because they are outside the allowable variable difference by being greater than the threshold difference by being above the threshold absorbance. The identified pixels that are abnormal can be appropriately marked in the category map.

In some embodiments, the system can perform methods to determine the one or more first pixels as being a gas leak based on the first variable difference in absorbance of the one or more first pixels being greater than the allowable variable difference in absorbance of the one or more first pixels in the fixed field of view. The pixels that are determined to be a gas leak can be analyzed in accordance with the protocol of FIG. 4C. In some embodiments, the system can perform methods to generate an alert that identifies the gas leak being present in the fixed field of view. The generation of the alert and protocol thereof can also be performed in accordance with the protocol of FIG. 4C.

In some embodiments, the system can perform methods to generate an alert that identifies the presence of a gas leak in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication.

Figure 5A:
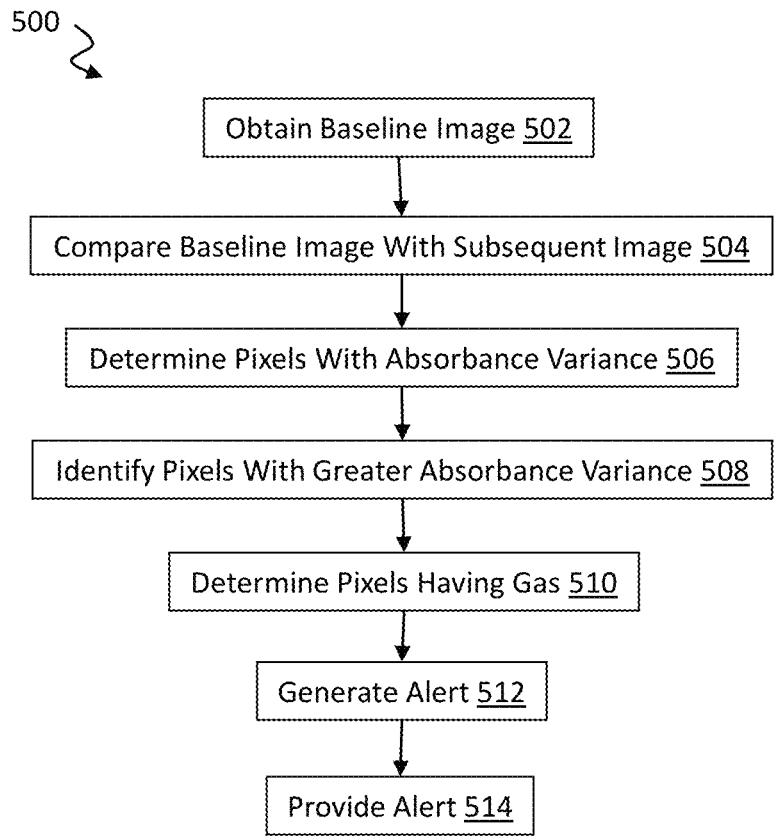
FIG. 5A illustrates a method of detecting a gas leak.

FIG. 5A illustrates a method 500 of detecting a gas leak. The method may be performed with a system described herein having at least one infrared imaging sensor and an imaging analysis computer. Step 502 includes obtaining at least one baseline infrared image of a fixed field of view without a gas leak being present. Step 504 includes analyzing some or all pixels in the fixed field of view for changes from the at least one baseline infrared image to at least one subsequent infrared image. Step 506 can include identifying variable differences in absorbance values for each pixel in the field of view between the at least one baseline infrared image and the at least one subsequent infrared image. Step 508 can include identifying a one or more first pixels in the at least one subsequent infrared image having a first variable difference in absorbance that is greater than allowable based on the distribution of absorbance variances in the at least one subsequent infrared image compared to the at least one baseline infrared image (e.g., greater than the threshold difference from the distribution or greater than the threshold absorbance). Step 510 can include determining the one or more first pixels as being a gas leak, and optionally determining one or more second pixels as being devoid of a gas leak based on the variable difference in absorbance of each pixel in the fixed field of view. Step 512 can include generating an alert that identifies the presence of a gas leak in the fixed field of view.

In some embodiments, the method can be performed to include providing the alert from the imaging analysis computer (step 514). This can include any of the following: providing the alert by actuating an audible and/or visible indicator; providing the alert by transmitting the alert to a remote device; and/or providing the alert as an audible or visible communication.

In some embodiments, the methods can include recording historical information of a plurality of infrared images of the fixed field of view received from the at least one infrared imaging sensor. Such historical information can include the images or image data for a number of images over a time period. The historical information can be used for establishing baselines and controls without a gas leak so that the changes in the images when a gas leak is present can be detected.

In some embodiments, the methods can include providing the alert on a display device. Such a display device can show images selected from: an infrared image from the at least one infrared sensor; a schematic of locations of the at least one infrared sensor; or a location of an alert.

In some embodiments, the methods can include recalibrating the system, which can be scheduled or as needed or desired. Once the system is recalibrated, the methods can obtain an updated at least one baseline infrared image after the recalibration.

Figure 5B:
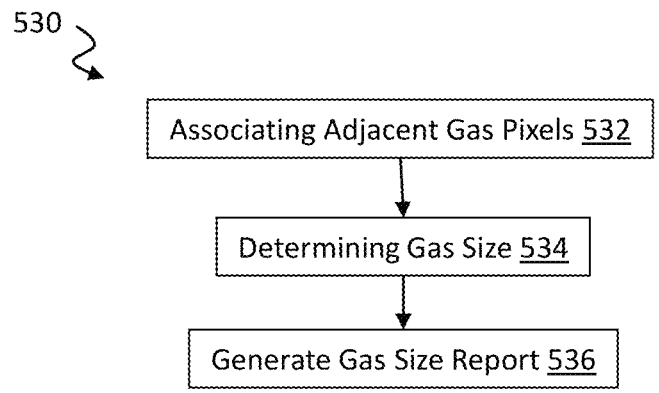
FIG. 5B includes a method for detecting an area size of a gas leak.

FIG. 5B shows another method 530 for detecting a gas leak. The method 530 can include: associating adjacent first pixels to identify a gas region (step 532); determining a size of the gas region (step 534); and generating a gas region size report that identifies the size of the gas leak region based on the associated adjacent first pixels (step 536). The method 530 may also include associating adjacent first pixels to identify a gas region; determining an area of the gas region; comparing the area of the gas region with a threshold area size; and generating the alert once the gas region has an area that is at least the size of the threshold size, wherein the threshold area size is a defined value or a percentage of a region of interest.

The determination of a gas leak based on the size of associated adjacent pixels also allows for the size of the leak or the rate of the leak to be estimated. Often, a faster leak rate will result in a gas cloud growing to a larger size. Accordingly, the change in size of a leak during a defined time period, such as frame to frame, or every ten frames, etc., can indicate the rate of gas cloud growth that is related to the rate of gas leaking. The rates can be modeled and applied to the current data. Also, comparing the size of the gas leak to known gas leak data and the known rates thereof can be used to interpolate or extrapolate for the rate of the current gas leak. The protocol can determine the number of adjacent pixels showing the absorbance (e.g., can be saturated absorbance) that is indicated to be abnormal, where the number of adjacent abnormal pixels that triggers and alert can be modulated in the algorithm to set the number of adjacent pixels showing as being a gas. The minimum number of adjacent pixels that trigger the alert can be mapped to a size of a leak, and thereby the size of the leak can be mapped to alert levels or mapped to leak levels. So, the size of the leak can be determined.

In some embodiments, the protocols can determine a pixel location or groups of pixels in a defined location that shows as a gas leak pixel before the other pixels. The protocol can identify the one or more pixels in an initial detection (e.g., initial absorbance map showing one or more abnormal pixels) showing as a gas leak. The initially detected pixels can indicate the location or source of the gas leak. The subsequent frames or subsequent absorbance maps can show the movement of the gas cloud by the movement of the gas pixels across the absorbance map in sequential absorbance maps. The movement of the gas cloud can be identified and tracked by tracking the change in pixel absorbance values that show a moving region, which is the gas cloud. The initial detected pixels as well as the gas region movement can be used to identify the source of the gas leak. The source of the gas leak can then be identified on the graphical user interface.

In some embodiments, the pixels of and around a detected gas leak source can be analyzed to detect the rate of the leak. Leaks with lower leak rates often can have smaller gas cloud regions (e.g., adjacent pixels being abnormal) at or around the detected gas leak source. Leaks with higher leak rates often can have larger gas cloud regions at or around the detected gas leak. The estimated size of the gas leak can then be used to estimate the quantity of the leak, such as in grams per hour, by measuring the gas leak area or volume at the detected gas leak source.

The concentration of the gas in a gas leak can also be estimated based on the absorbance value as well as on changes to a group of adjacent pixels. The absorbance value can indicate the amount of absorbance, which is an indication of concentration of gas for each pixel as more gas absorbs more IR light. Additionally, a computed gas leak area or estimated volume at a detected gas leak source inside a hypothetical or arbitrary area of pixels or a hypothetical or arbitrary cubic space can be monitored over a set time period. This can provide indications of the concentration of the gas, such as a parts per billion (PPB). Also, prior leak data may be used for comparison purposes for gas concentration estimation in any detected gas leak pixels.

In some embodiments, the protocol can identify a gas cloud region in the pixels of an absorbance map or image, and then track that identified gas cloud region as it moves across the pixels across a series of images. The behavior of gas results in the gas moving in a gas cloud movement pattern, which can be modeled. The gas cloud often has a nebulous shape that changes as the gas cloud develops and moves, and thereby the associated pixels also have the same shape that changes over a series of images. That is, the shape of the gas cloud pixels is different is sequential images such that it appears that the pixels gas cloud is actually visually representative of a gas cloud. In contrast, non-gas entities may appear in the field of view, which may move across the field of view in various ways. Some examples of non-gas entities that commonly obstruct the field of view include animals (e.g., humans, birds, insects, etc.), vehicles (e.g., cars, drones, utility, etc.), plant debris (e.g., leaves), dust clouds, steam clouds, or the like. Each of these non-gas entities move significantly different to gas clouds except for steam clouds and dust clouds. As such, the movement pattern of the non-gas entity as pixels across multiple images can be flagged as non-gas movement patterns, and the alert may be not generated or suppressed. Accordingly, the movement of a contiguous pixel area across a series of images can be compared to a movement model of a gas cloud and to movement models of non-gas entities. Significantly different movement behavior from gas cloud movement can be identified by monitoring the pixels over a series of images, or against a series of updated category maps. Also, for steam clouds, dust clouds, or other, these clouds other than hydrocarbon gas and carbon monoxide gas do not have the IR absorption, so they are not registered by the camera with absorbance pixel data.

In the embodiments described herein, the methods can be performed with the system that is described, and can use the computer for making the calculations and other actions.

In some embodiments, the method can include: associating adjacent pixels in the at least one gas absorption region to identify a gas leak region; obtaining a model of at least one type of gas cloud for a hydrocarbon gas or carbon monoxide gas; comparing the model of the gas cloud with the gas leak region; and determining the adjacent pixels to be the gas leak based on similarities between the model of the gas cloud and the gas leak region.

In some embodiments, the method can include: identifying a rate of emission for at least one type of gas; obtaining a minimum rate of detection for the at least one type of gas; and generating the alert when the rate of emission is at least the minimum rate of detection. For example, the minimum rate of detection can be: carbon monoxide—0.8 g/hr; 1-Pentene—5.6 g/hr; Benzene—3.5 g/hr; Butane—0.4 g/hr; Ethane—0.6 g/hr; Ethanol—0.7 g/hr; Ethyl benzene—1.5 g/hr; Ethylene—4.4 g/hr; Heptane—1.8 g/hr; Hexane—1.7 g/hr; Isoprene—8.1 g/hr; methyl ethyl ketone (MEK)—3.5 g/hr; Methane—0.8 g/hr; Methanol—3.8 g/hr; methyl isobutyl ketone (MIBK)—2.1 g/hr; Octane—1.2 g/hr; Pentane—3.0 g/hr; Propane—0.4 g/hr; Propylene—2.9 g/hr; Toluene—3.8 g/hr; and/or Xylene—1.9 g/hr.

In some embodiments, the method can include: accessing a memory device that includes thermal data for one or more surfaces in the fixed field of view, each surface corresponding to at least one pixel in the at least one baseline image and the at least one subsequent image; obtaining the thermal data for the one or more surfaces in the fixed field of view; and computing with the thermal data for the one or more surfaces in the fixed field of view during the analysis of the pixels in the fixed field of view.

In some embodiments, the method can include: accessing a memory device that includes distance data for one or more surfaces in the fixed field of view from the at least one infrared imaging sensor, each surface corresponding to at least one pixel in the at least one baseline image and the at least one subsequent image; obtaining the distance data for the one or more surfaces in the fixed field of view; and computing with the distance data for the one or more surfaces in the fixed field of view during the analysis of the pixels in the fixed field of view.

In some embodiments, the method can include obtaining the at least one baseline infrared image by: acquiring a series of infrared images of the fixed field of view; analyzing pixel data of each infrared image of the series to determine a pixel absorbance for each pixel for each infrared image; determining a range of pixel absorbance values for each pixel without the gas leak being present in the fixed field of view across the series of infrared images of the fixed field of view; and setting the allowable variable difference in absorbance to include the determined range of pixel temperatures for each pixel without the gas leak.

In some embodiments, the method can include obtaining the at least one baseline infrared image by: performing a statistical analysis of the range of pixel absorbance values for each pixel without the gas leak being present across the series of infrared images of the fixed field of view to determine an allowable distribution of pixel absorbance values for each pixel; and setting the at least one baseline infrared image so that each pixel includes the allowable distribution of pixel absorbance values.

In some embodiments, the at least one baseline infrared image is a model of each pixel with the allowable distribution of pixel absorbance values for each pixel, wherein the model of the pixel is obtained by: determining a distribution of the pixel absorbance for each pixel without the gas leak being present across the series of infrared images; identifying a maximum pixel absorbance that is greater than the distribution of pixel absorbance values by a first difference;

and setting the first difference from the distribution to indicate absence of the gas leak for each pixel. Each pixel can have its own model based on the historical absorbance values.

In some embodiments, the method can include: comparing each pixel absorbance in the one or more subsequent infrared images with the model of each pixel with the allowable distribution of pixel absorbance values; determining a difference between each pixel absorbance in the one or more subsequent infrared images and the model of each pixel; determining whether the difference is greater than a threshold difference, when the difference is greater than the threshold difference, determine that the pixel is a gas leak pixel, or when the difference is less than the threshold difference, determine that the pixel is a surface pixel or is not a gas leak pixel.

In some embodiments, the method can include: continuously updating the model in real time; and continuously comparing new infrared images with the model in real time.

In some embodiments, the method can include: determining a standard deviation of the distribution of the pixel absorbance values for each pixel without the gas leak being present across the series of infrared images; and setting the threshold difference as being a defined difference from the standard deviation.

In some embodiments, the system can be programmed with instructions to perform the methods described herein. The system can also be programmed to track all leak detected locations. Accordingly, once an area or location is tagged as a gas leak area, the system can update the database so that this area is monitored as part of a specifically monitored group. The known leak locations can be routinely monitored and analyzed for gas leak data, such as source of leak, leak rate, leak volume, leak density/intensity, or other information. The sensitivity of known leak pixels may be programmed so that system responds to changes in the absorbance appropriately, such as when there are small leaks setting a higher threshold until the leak is fixed so that an increase in the leak rate or other worsening of the leak can be identified. Another example is setting a lower threshold in an area without any leak history. Accordingly, the system can be programmed to accommodate desired operability. Additionally, the known leak locations can be tagged for maintenance and maintenance planning. The system can provide real time updates on the status of a known leak location, whether or not actively leaking. When leaking, the system can provide reports for any increases in leak rate or any other leak change over a period of time. These reports can include analytical data for the analyzed leak to provide any of the leak parameters described herein in real time or over defined time periods.

In some embodiments, the system can be programmed to automatically change flow rate of gas within gas conduits or other gas containing or moving components. For example, gas is often carried in pipes, through pumps, and across junctions, any of which may develop a crack or opening that may leak gas. Once a gas-containing component is identified as a source of the gas leak, the system can automatically regulate the gas amount or gas flow in that component. For example, the system may generate an alert of a gas leak, analyze for the location of the gas leak, and then modulate the gas-containing component to regulate the gas, such as by shutting off flow to the leak location. For another example, the system can automatically acute pumps, valves, or other equipment to modulate, reduce or stop the flow of gas to the gas leak location. In another example, the computer can enable a gas valve shutdown for gas leaks that exceed a leak volume, rate or duration, which may be set by the operator to automatically control the valves.

In some embodiments, the methods can be operated by software. The software manages the network connections on a 1 to 1 basis with each IR camera to monitor camera performance, assigns correct algorithms to each camera depending on the solution assigned to the camera, monitors alerts from cameras, displays alert and related IR images for all cameras, assigns CPUs to cameras depending on performance requirements and records historical information as determined by the refinery subsystems. The hardware to run the refinery infrared management system can include a multi-CPU racked based system that is scalable to allow for additional cameras added to each solution. The hardware, memory and disk management system can be scoped and selected based on the final numbers of IR cameras.

The system can contain a series of LCD display screens to show overall management of the infrared system, highlight alert locations as they are triggered, allow for the display of the IR image from any IR camera, and display operational views of each system such as the tank level management, thermal component operations, gas and gas leak detection. The display system can utilize the graphical displays from the relative refinery unit to show locations of IR cameras, IR images and IR alerts locations.

The present invention can provide many improvements in gas leak detection. Some features of the system are: monitors key components and processes for gas leaks (e.g., pumps, pipes, flanges and other connections); provides real time alerts and images of suspected gas leaks; if an alert is triggered due to gas leak being present, camera can be recalibrated once gas is removed to insure setting of the correct baseline image; the system communicates with all cameras to receive radiometric data from image as well as IR variables (temperature, humidity, etc.) from the camera that can be used in calculations and algorithms; the system records and stores 1 image per second for a up to 12 hours or more; an alert will set off an alarm, such as flash the icon on the system graphical display to designate leak location and at user option display the IR image; the system has the ability to set tolerances of sensitivity to minimize false alerts; and provides an average frame rate of 30 frames/sec.

In some embodiments, the present protocols do not do image matching in that the entirety of the image is not frame matched to another image to determine changes in the image. For example, the protocols describe herein omit any jpeg or other image file format being used to compare visual images to each other. Instead, the present technology obtains each pixel of each image, and analyzes that pixel in each image for the current absorbance value, and compares the absorbance value of a current image to absorbance values or variations of absorbance values from historical pixel absorbance values. The measured absorbance and comparison to historical absorbance values can allow for the detection of a gas leak when contiguous pixels have absorbance values outside of the historical pixel absorbance values, such as being outside by a defined difference thereof.

In some embodiments, the present protocols can be used to determine the intensity of a gas from a gas leak. The protocol can analyze the pixel absorbance value, and compare the pixel absorbance value to the allowable distribution of pixel absorbance values. Once the pixel absorbance value is identified as being abnormal and thereby a gas leak, the value can be compared to a model gas leak absorbance values or to historical gas leak absorbance values in order to determine the intensity of the gas. The more absorbance in a pixel indicates a higher intensity of gas as more gas molecules with attenuate the IR light more to show as more absorbance. Accordingly, a model, lookup table, or historical variation map can be used to determine the intensity of gas by the intensity or level of saturation on each pixel. A sensitivity setting in the algorithm, such as by the defined distance D from the distribution, can be modulated to change the minimum level of gas that causes an alert. When the defined distance D is smaller, then the sensitivity level may be high because absorbance values are more likely to be within the distance D to the distribution, in part based on historical data. When the defined distance D is larger, then the sensitivity level may be low because it takes more gas to cause more absorbance in order to trigger the alert.

Figure 7A:
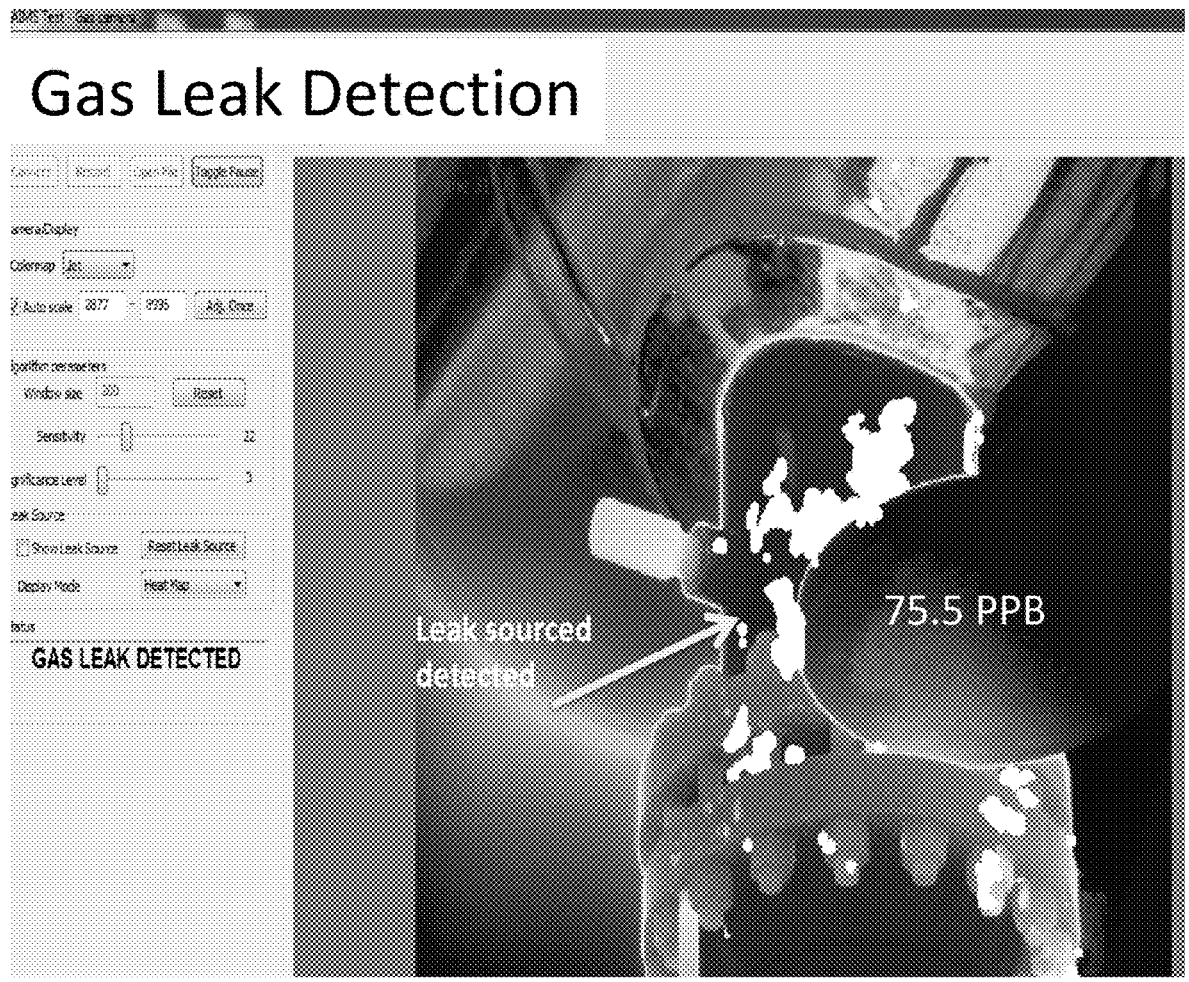
FIG. 7A shows an image of an embodiment of a graphical user interface that can be received in real time.

FIG. 7A shows an image of an embodiment of a graphical user interface that can be received in real time. The image shows the "GAS LEAK DETECTED" alert has been triggered and the leak source identified. The image shows the gas leak as white, showing more absorbance that the background or other pixels that don't have the gas. The shape of the gas pixel area can also be observed. The estimated parts per billion of 75.5 PPB is also shown to the operator. As can be seen, the operator can adjust the color map as desired, determine the scale, sensitivity, significance level, leak source, or other information.

Figure 7B:
FIG. 7B shows another image of an embodiment of a graphical user interface that can be received in real time with the gas leaks showing as white regions.

FIG. 7B shows another image of an embodiment of a graphical user interface that can be received in real time with the gas leaks showing as white regions.

Accordingly, the IR cameras can provide the images for components such as compressors, pumps, pipes, flanges, tanks, fractionators, demethanizers, or other equipment. The system can detect gas leaks at minimal saturation levels at distances up to 150 meters. The system can determine the leak source and provide this information to the operator. The gas leak volume can also be provided to the operator in real time. The system can record historical data on leak levels, can be programmed to provide alerts at operator defined leak volumes.

In some embodiments, the methods collect a series of images and analyzes the images to determine whether one or more abnormal pixels exist in the same pixel location for some duration. If a specific pixel or region of pixels only shows as abnormal for a few frames or not for a long enough duration, it can be determined that the abnormal pixels were an aberration or a non-gas cloud entity. Such a short term duration of an abnormal pixel can be flagged as a potential false alarm.

In one embodiment, the type of gas is determined by the location of the gas leak being from a region having a known type of gas. For example, a methane conduit will leak methane alone.

For this and other processes and methods disclosed herein, the operations performed in the processes and methods may be implemented in differing order.

Furthermore, the outlined operations are only provided as examples, and some operations may be optional, combined into fewer operations, eliminated, supplemented with further operations, or expanded into additional operations, without detracting from the essence of the disclosed embodiments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A system for detecting a gas leak, comprising:
   at least one infrared imaging sensor, wherein the at least one infrared imaging sensor is a mid-wave infrared camera configured for detecting absorption in a mid-wave IR bandwidth, each infrared imaging sensor being configured to capture infrared images of a scene, each infrared image comprising a plurality of pixels, each pixel of each infrared image having a corresponding pixel value;
   an imaging analysis computer operably coupled with the at least one infrared imaging sensor, wherein the imaging analysis computer is configured to:
      generate at least one baseline infrared image of a fixed field of view of the scene without the gas leak being present;
      obtain at least one subsequent infrared image of a fixed field of view of the scene;
      identify at least one gas absorption region in the at least one infrared image based on a plurality of pixels in the at least one subsequent infrared image having a variable difference from a corresponding plurality of pixels in the at least one baseline infrared image, wherein the at least one gas absorption region includes the plurality of pixels having an absorption and/or saturation in a narrow infrared bandwidth, wherein the narrow infrared bandwidth is absorbed by a gas leak, wherein the gas leak is selected from a hydrocarbon gas or carbon monoxide gas;
      determine the at least one gas absorption region as being a gas leak; and
      generate an alert that identifies the presence of the gas leak in the fixed field of view.

2. The system of claim 1,
   wherein the narrow infrared bandwidth is:
   about 3.2 microns to about 3.4 microns for the hydrocarbon gas; or
   about 4.5 microns to about 4.7 microns for the carbon monoxide gas.

3. The system of claim 1, wherein the imaging analysis computer is configured to:
   analyze all pixels in the fixed field of view for changes from the at least one baseline infrared image to the at least one subsequent infrared image;
   identify variable differences in absorbance for each pixel in the field of view between the at least one baseline infrared image and the at least one subsequent infrared image;
   identify one or more first pixels in the at least one subsequent infrared image having a first variable difference in absorbance that is outside an allowable variable difference in absorbance for the one or more first pixels in the at least one subsequent infrared image compared to the allowable variable difference in absorbance for the one or more first pixels in the at least one baseline infrared image; and
   determine the one or more first pixels as being a gas leak based on the first variable difference in absorbance of the one or more first pixels being greater than the allowable variable difference in absorbance of the one or more first pixels in the fixed field of view.

4. The system of claim 3, wherein the one or more first pixels have more absorption and/or saturation in the at least one subsequent infrared image compared to the at least one baseline infrared image when an ambient temperature of the field of view is greater than or about a polarity switching temperature, wherein the imaging analysis computer is configured to perform a polarity check comprising:
   determining the ambient temperature during obtaining the at least one infrared image with the at least one infrared imaging sensor; and
   determining whether the ambient temperature correlates with increased absorbance or less absorbance indicating presence of the gas leak.

5. The system of claim 3, wherein the one or more first pixels have more absorption and/or saturation in the at least one subsequent infrared image compared to the at least one baseline infrared image when an ambient temperature of the field of view is less than a polarity switching temperature, wherein the imaging analysis computer is configured to perform a polarity check comprising:
   determining the ambient temperature during obtaining the at least one infrared image with the at least one infrared imaging sensor; and
   determining whether the ambient temperature correlates with increased absorbance or less absorbance indicating presence of the gas leak.

6. The system of claim 2, wherein the imaging analysis computer is configured to:
   obtain a gas absorbance threshold for a hydrocarbon gas or a carbon monoxide gas;
   compare the detected absorbance with the gas absorbance threshold; and
   generate the alert when the detected absorbance is at or exceeds the gas absorbance threshold,
   wherein the gas absorbance threshold is:
   a threshold value; or
   a difference from an absorbance measurement value and a historical absorbance value range.

7. The system of claim 2, wherein at least one of the infrared imaging sensor includes an explosion proof housing.

8. The system of claim 1, wherein the imaging analysis computer is configured to:
   associate adjacent pixels in the at least one gas absorption region to identify a gas leak region;

determine a size of the gas leak region; and
generate a gas leak region size report that identifies the size of the gas leak region based on the associated adjacent pixels; or
compare the area of the gas leak region with a threshold area size and generate the alert once the gas leak region has an area that is at least the size of the threshold area size, wherein the threshold area size is a defined value or a percentage of a region of interest.

9. The system of claim 1, wherein the imaging analysis computer is configured to perform at least one of the following:
determine a relative humidity and compute with the relative humidity during an analysis of the pixels in the fixed field of view;
obtain the thermal data for the one or more surfaces in the fixed field of view and compute with the thermal data for the one or more surfaces in the fixed field of view during the analysis of the pixels in the fixed field of view; or
obtain the distance data for the one or more surfaces in the fixed field of view and compute with the distance data for the one or more surfaces in the fixed field of view during the analysis of the pixels in the fixed field of view.

10. The system of claim 1, wherein the imaging analysis computer is configured to:
identify a rate of emission for at least one type of gas;
obtain a minimum rate of detection for the at least one type of gas; and
generate the alert when the rate of emission is at least the minimum rate of detection.

11. The system of claim 3, wherein the imaging analysis computer is configured to obtain the at least one baseline infrared image by:
acquiring a series of infrared images of the fixed field of view;
analyzing pixel data of each infrared image of the series to determine a pixel absorbance for each pixel for each infrared image;
determining a range of pixel absorbance values for each pixel without the gas leak being present in the fixed field of view across the series of infrared images of the fixed field of view; and
setting the allowable variable difference in absorbance to include the determined range of pixel temperatures for each pixel without the gas leak.

12. The system of claim 11 wherein the imaging analysis computer is configured to obtain the at least one baseline infrared image by:
performing a statistical analysis of the range of pixel absorbance values for each pixel without the gas leak being present across the series of infrared images of the fixed field of view to determine an allowable distribution of pixel absorbance values for each pixel; and
setting the at least one baseline infrared image so that each pixel includes the allowable distribution of pixel absorbance values.

13. The system of claim 11, wherein the at least one baseline infrared image is a model of each pixel with the allowable distribution of pixel absorbance values for each pixel, wherein the model of the pixel is obtained by:
determining a distribution of the pixel absorbance for each pixel without the gas leak being present across the series of infrared images;
identifying a maximum pixel absorbance that is greater than the distribution of pixel absorbance values by a first difference; and
setting the first difference from the distribution to indicate absence of the gas leak for each pixel.

14. The system of claim 13, wherein the imaging analysis computer is configured to:
compare each pixel absorbance in the one or more subsequent infrared images with the model of each pixel with the allowable distribution of pixel absorbance values;
determine a difference between each pixel absorbance in the one or more subsequent infrared images and the model of each pixel;
determine whether the difference is greater than a threshold difference,
when the difference is greater than the threshold difference, determine that the pixel is a gas leak pixel, or
when the difference is less than the threshold difference, determine that the pixel is a surface pixel or is not a gas leak pixel.

15. A method for detecting a gas leak, the method comprising:
providing the system of claim 1;
generating the at least one baseline infrared image;
obtaining the at least one subsequent infrared image of a fixed field of view;
identifying at least one gas absorption region in the at least one infrared image based on the plurality of pixels in the at least one subsequent infrared image having the variable difference from the corresponding plurality of pixels in the at least one baseline infrared image, wherein the at least one gas absorption region includes the plurality of pixels having the absorption and/or saturation in the narrow infrared bandwidth, wherein the narrow infrared bandwidth is absorbed by the gas leak, wherein the gas leak is selected from the hydrocarbon gas or carbon monoxide gas;
determining the at least one gas absorption region as being the gas leak; and
generating the alert that identifies the presence of the gas leak in the fixed field of view.

16. The method of claim 15,
wherein the narrow infrared bandwidth is:
about 3.2 microns to about 3.4 microns for the hydrocarbon gas; or
about 4.5 microns to about 4.7 microns for the carbon monoxide gas.

17. The method of claim 15, further comprising:
analyzing all pixels in the fixed field of view for changes from the at least one baseline infrared image to the at least one subsequent infrared image;
identifying variable differences in absorbance for each pixel in the field of view between the at least one baseline infrared image and the at least one subsequent infrared image;
identifying one or more first pixels in the at least one subsequent infrared image having a first variable difference in absorbance that is outside an allowable variable difference in absorbance for the one or more first pixels in the at least one subsequent infrared image compared to the allowable variable difference in absorbance for the one or more first pixels in the at least one baseline infrared image; and
determining the one or more first pixels as being a gas leak based on the first variable difference in absorbance of the one or more first pixels being greater than the allowable variable difference in absorbance of the one or more first pixels in the fixed field of view.

18. The method of claim 17, further comprising performing a polarity check comprising:
determining the ambient temperature during obtaining the at least one infrared image with the at least one infrared imaging sensor; and
determining whether the ambient temperature correlates with increased absorbance or less absorbance indicating presence of the gas leak,
wherein the one or more first pixels have more absorption and/or saturation in the at least one subsequent infrared image compared to the at least one baseline infrared image when an ambient temperature of the field of view is greater than or about a polarity switching temperature; or
wherein the one or more first pixels have more absorption and/or saturation in the at least one subsequent infrared image compared to the at least one baseline infrared image when an ambient temperature of the field of view is less than a polarity switching temperature.

19. The method of claim 17, further comprising:
obtaining a gas absorbance threshold for a hydrocarbon gas or a carbon monoxide gas;
comparing the detected absorbance with the gas absorbance threshold; and
generating the alert when the detected absorbance is at or exceeds the gas absorbance threshold,
wherein the gas absorbance threshold is:
a threshold value; or
a difference from an absorbance measurement value and a historical absorbance value range.

20. The method of claim 15, further comprising:
associating adjacent pixels in the at least one gas absorption region to identify a gas leak region;
determining a size of the gas leak region; and
generating a gas leak region size report that identifies the size of the gas leak region based on the associated adjacent pixels; or
comparing the area of the gas leak region with a threshold area size and generating the alert once the gas leak region has an area that is at least the size of the threshold area size, wherein the threshold area size is a defined value or a percentage of a region of interest.

21. The method of claim 15, further comprising at least one of the following:
determining a relative humidity and computing with the relative humidity during an analysis of the pixels in the fixed field of view;
obtaining the thermal data for the one or more surfaces in the fixed field of view and compute with the thermal data for the one or more surfaces in the fixed field of view during the analysis of the pixels in the fixed field of view; or
obtaining the distance data for the one or more surfaces in the fixed field of view and compute with the distance data for the one or more surfaces in the fixed field of view during the analysis of the pixels in the fixed field of view.

22. The method of claim 15, further comprising:
identifying a rate of emission for at least one type of gas;
obtaining a minimum rate of detection for the at least one type of gas; and
generating the alert when the rate of emission is at least the minimum rate of detection.

23. The method of claim 17, further comprising obtaining the at least one baseline infrared image by:
acquiring a series of infrared images of the fixed field of view;
analyzing pixel data of each infrared image of the series to determine a pixel absorbance for each pixel for each infrared image;
determining a range of pixel absorbance values for each pixel without the gas leak being present in the fixed field of view across the series of infrared images of the fixed field of view; and
setting the allowable variable difference in absorbance to include the determined range of pixel temperatures for each pixel without the gas leak.

24. The method of claim 23, further comprising obtaining the at least one baseline infrared image by:
performing a statistical analysis of the range of pixel absorbance values for each pixel without the gas leak being present across the series of infrared images of the fixed field of view to determine an allowable distribution of pixel absorbance values for each pixel; and
setting the at least one baseline infrared image so that each pixel includes the allowable distribution of pixel absorbance values.

25. The method of claim 23, wherein the at least one baseline infrared image is a model of each pixel with the allowable distribution of pixel absorbance values for each pixel, wherein the model of the pixel is obtained by:
determining a distribution of the pixel absorbance for each pixel without the gas leak being present across the series of infrared images;
identifying a maximum pixel absorbance that is greater than the distribution of pixel absorbance values by a first difference; and
setting the first difference from the distribution to indicate absence of the gas leak for each pixel.

26. The method of claim 25, further comprising:
comparing each pixel absorbance in the one or more subsequent infrared images with the model of each pixel with the allowable distribution of pixel absorbance values;
determining a difference between each pixel absorbance in the one or more subsequent infrared images and the model of each pixel;
determining whether the difference is greater than a threshold difference,
when the difference is greater than the threshold difference, determine that the pixel is a gas leak pixel, or
when the difference is less than the threshold difference, determine that the pixel is a surface pixel or is not a gas leak pixel.

\* \* \* \* \*